US006165619A

United States Patent [19]

Ikenaga et al.

[11] Patent Number: 6,165,619

[45] Date of Patent: Dec. 26, 2000

[54] FUNCTIONAL COATED PRODUCT AND PROCESS FOR PRODUCING THE SAME AND THE USE THEREOF

[75] Inventors: Junko Ikenaga, Osaka; Takeyuki Yamaki, Neyagawa; Koichi Takahama, Amagasaki; Toshiharu Sako, Suita; Hirotsugu Kishimoto, Toyonaka, all of Japan

[73] Assignee: Matsushita Electric Works, Ltd., Kadom, Japan

[21] Appl. No.: 09/117,738

[22] PCT Filed: Dec. 11, 1997

[86] PCT No.: PCT/JP97/04559

§ 371 Date: Aug. 5, 1998

§ 102(e) Date: Aug. 5, 1998

[87] PCT Pub. No.: WO98/25711

PCT Pub. Date: Jun. 18, 1998

[30] Foreign Application Priority Data

| | | | |
|---|---|---|---|
| Dec. 13, 1996 | [JP] | Japan | 8-334024 |
| Feb. 28, 1997 | [JP] | Japan | 9-046087 |

[51] Int. Cl.[7] .............................. B05D 7/24; B32B 15/08

[52] U.S. Cl. ....................... 428/448; 427/387; 427/388.1; 427/397.7; 427/407.1; 427/409; 427/419.8; 428/447; 428/450; 428/451

[58] Field of Search .................................... 428/447, 448, 428/450, 451; 427/387, 388.1, 397.7, 407.1, 409, 419.8

[56] References Cited

FOREIGN PATENT DOCUMENTS

| | | |
|---|---|---|
| 8-67835 | 3/1996 | Japan . |
| 8-259891 | 10/1996 | Japan . |

*Primary Examiner*—D. S. Nakarani
*Attorney, Agent, or Firm*—Birch, Stewart, Kolasch & Birch, LLP

[57] ABSTRACT

The present invention provides a functional coated product having excellent adhesion properties of a coating to a substrate, hardly causing the deterioration of the substrate and the coating due to a photocatalyst, hardly having dirt because the smoothness of the surface coating is high, and having high photocatalytic action; a method for producing the same and the use thereof.

The coated product of the present invention has the first coating layer comprising a cured coating made of an acryl-modified silicone resin coating material, which is formed on the surface of the substrate, and the second coating layer comprising a cured coating made of a functional coating material containing the photocatalyst, which is formed con the surface of the first coating layer. When producing such a coated product, the acryl-modified silicone resin coating material is applied to the surface of the substrate as the first coating layer and it is semi-cured. After that, a photocatalyst-containing functional coating material is applied to the surface of this first coating layer in a semi-cured condition and then both of the coating layers are cured. Thereby, a coated product having a higher effect can be obtained.

26 Claims, No Drawings

FUNCTIONAL COATED PRODUCT AND PROCESS FOR PRODUCING THE SAME AND THE USE THEREOF

This application is the national phase under 35 U.S.C. §371 of prior PCT International Application No. PCT/JP97/04559 which has an International filing date of Dec. 11, 1997 which designated the United States of America, the entire contents of which are hereby incorporated by reference.

BACKGROUND OF THE INVENTION

1. Field of the Invention

The present invention relates to a functional coated product having photocatalytic activity and a process for producing the same and the use thereof.

2. Description of the Prior Art

When a photocatalyst is added to a coating material, the resulting coating is irradiated by ultraviolet light to exhibits a decomposing effect of organic substances, deodorizing effect, antifungal effect, etc.

As a coating material having such photocatalytic function, for example, a photocatalytic organic paint in which photocatalytic particles are dispersed in organic resin is known. However, the photocatalytic organicpaint has a drawback that the coating is deteriorated due to ultraviolet rays and photocatalytic function.

An inorganic paint, in which photocatalytic particles are dispersed in an inorganic composition such as a silicate, a phosphate or a zirconate, is known as a coating material having photocatalytic function. These inorganic paints have much better durability than that of photocatalytic organic paints, however, it is necessary to conduct baking at a high temperature of 200° C. or more. Therefore, the range of usage is limited, and it was not suitable for applying them directly to a construction material or plastic which has inferior heat resistance. Further, the silicate inorganic paint has also a drawback that an alkali was eluted to cause a whitening phenomenon easily.

In Japanese Patent Publication Laid-Open No. 57470/1987, an inorganic paint in which a metal alkoxide is contained is disclosed. This inorganic paint is cured at a temperature of not more than 200° C., however, the coating does not have flexibility and there was a problem that crack easily occurred.

Recently, with a necessity to apply a paint to various materials, a low-temperature curing paint keeping its photocatalytic performance even if it is used for a long time, having durability in the coating itself has been desired.

In Japanese Patent Publication Laid-Open No. 67835/1996, an antifungal inorganic paint containing a photocatalyst, which is a component having a photocatalytic function as an anti-fungus agent, is proposed. However, when a photocatalyst was supported on a substrate, there was a problem concerning the limitation of the substrate or adhesion properties. Further, there was a tendency that the photocatalyst was precipitated in the paint, and the performance of the photocatalyst was not easily exhibited.

Therefore, in Japanese Patent Publication Laid Open No. 141503/1996, the improvement in a method for forming an inorganic coating having photocatalyst on the surface thereof and high photocatalytic performance is suggested. This coating has high adhesion to an inorganic substrate, however, it has poor adhesion to the surface of plastic or a material coated with an organic substance. Further, a coating of the above-mentioned inorganic coating lacks in smoothness on the surface, therefore there was a drawback that dirt is easily adhered.

Further, when a paint containing a photocatalyst is directly applied to the surface of an organic substrate or a substrate coated with an organic substance, there was a problem that said substrate was easily deteriorated due to the action of the photocatalyst.

SUMMARY OF THE INVENTION

An object of the present invention is to provide a functional coated product which has excellent adhesion properties to various substrates, hardly causes the deterioration of the substrate and a coating due to the action of a photocatalyst and also has high photocatalytic function, and a process for producing the same and the use thereof.

The functional coated product of the present invention has the first coating layer comprising a cured coating made of an acryl-modified silicone resin coating material, and the second coating layer comprising a cured coating made of a functional coating material (1) or (2) below. The present invention also provides a production method of the functional coated product and use thereof.

DETAILED DESCRIPTION OF THE PREFERRED EMBODIMENTS

The functional coated product of the present invention has a first coating layer comprising a cured coating made of an acryl-modified silicone resin coating material, and a second coating layer comprising a cured coating made of a functional coating material (1) or (2).

A process for producing a functional coated product of the present invention which comprises the following steps:

- forming a first coating layer by applying an acryl-modified silicone resin coating material to surface of a substrate,
- forming a semi-cured layer by semi-curing the first coating layer,
- forming a second coating layer by applying a functional coating material (1) or (2) to the semi-cured first coating layer, and
- curing said semi-cured layer and said second coating layer.

The acryl-modified silicone resin coating material contains the following components (A), (B), (C) and (D).

The functional coating material (1) contains the following components (E) and (F).

The functional coating material (2) contains the following components (A), (B), (C), and (F).

Component (A):

a silica-dispersed organosilane oligomer solution obtained by partially hydrolyzing a hydrolytic organosilane represented by the general formula $$R^1{}_mSiX_{4-m} \quad (I)$$

(wherein $R^1$ indicates a substituted or non-substituted monovalent hydrocarbon group having 1 to 8 carbon atoms, which may be the same or different, m indicates an integer of 0 to 3, and X indicates a hydrolytic group)

in an organic solvent, water or colloidal silica dispersend in a mixed solvent thereof, under the condition that 0.001 to 0.5 mol of water is used based on 1 mol equivalent of the above-mentioned hydrolytic group (X);

Component (B):

a polyorganosiloxane represented by the average compositional formula:

$$R^2_aSi(OH)_bO_{(4-a-b)/2} \quad (II)$$

(wherein $R^2$ indicates a substituted or non-substituted monovalent hydrocarbon group having 1 to 8 carbon atoms, which may be the same or different, a and b separately satisfy the following condition:

$$0.2 \leq a \leq 2,\ 0.0001 \leq b \leq 3,\ a+b<4),$$

which contains a silanol group in its molecule;

Component (C):

a curing catalyst;

Component (D):

an acrylic copolymer resin of three (meth)acrylate components represented by the general formula (III):

$$CH_2{=}CR^3(COOR^4) \quad (III)$$

(wherein $R^3$ is a hydrogen atom and/or a methyl group), comprising the first (meth)acrylate component in which $R^4$ is a substituted or non-substituted hydrocarbon group having 1 to 9 carbon atoms, the second methacrylate in which $R^4$ is at least one group selected from the group consisting of an epoxy group, a glycidyl group and a hydrocarbon group containing at least either of those groups, and the third methacrylate in which $R^4$ is a hydrocarbon group containing an alkoxy silyl group and/or a halogenated silyl group); and said acrylic copolymer resin has an average molecular weight of 1,000 to 50,000 (in terms of polystyrene).

In the present specification, (meth)acrylate indicates either acrylate or methacrylate or both of them.

Component (E):

an organosiloxane comprising a hydrolytic polycondensate comprising a mixture of (E1) 5 to 30,000 parts by weight of a silica compound represented by the general formula:

$$Si(OR^5)_4$$

and/or colloidal silica, (E2) 100 parts by weight of a silica compound represented by the general formula:

$$R^6Si(OR^5)_3$$

(E3) 0 to 60 parts by weight of a silica compound represented by the general formula:

$$R^6_2Si(OR^5)_2$$

(wherein $R^5$ and $R^6$ indicate a monovalent hydrocarbon group) and said weight-average molecular weight being adjusted to 800 or more in terms of polystyrene; and Component (F):

a photocatalyst.

In the above-mentioned acryl-modified silicone resin coating material, it is preferred that 1 to 94 parts by weight of Component (B) and 5 to 35 parts by weight of Component (D) are formulated in 1 to 94 parts by weight of Component (A), based on the solid content of the whole condensate (provided that the total amount of Components (A), (B) and (D) comes to 100 parts by weight).

The above-mentioned acryl-modified silicone resin coating material may contain a pigment.

It is preferred that the above-mentioned substrate is selected from the group consisting of a metallic substrate, an organic substrate and a substrate coated with an organic substance in which either one of the above substrates has a coating formed from an organic substance on the surface thereof.

The coated product of the present invention can be used for, for example, a member related to building construction, particularly, an outdoor member related to building construction, a gate for a building, and a member to be used for that purpose (e.g., a gate pier, etc.), a wall for a building and a member to be used for that purpose, a window (e.g., a lighting window, etc.), and a member to be used for that purpose (e.g., a window frame, etc.), an automobile, mechanical equipment, particularly, outdoor mechanical equipment, a member for highway-related construction, (particularly, a traffic-control sign), a post for public notice, particularly, an outdoor post for public notice, an indoor or outdoor lighting fixture and a member to be used for that purpose (e.g., a resin material, a metal material, etc.), by equipping it with at least a part of the above-mentioned materials.

Silica compounds (E1) to (E3), which are used as a raw material of Component (E) of the functional coating material (1), can be represented by the general formula $$R^6nSi(OR^5)_{4-n} \quad (IV)$$

Herein $R^5$ and $R^6$ indicate a monovalent hydrocarbon group, and n indicates an integer of 0 to 2.

$R^6$ is not specifically limited, but may be, for example, a substituted or nonsubstituted monovalent hydrocarbon group having 1 to 8 carbon atoms. Examples thereof include alkyl groups such as methyl groups, ethyl groups, propyl groups, butyl groups, pentyl groups, hexyl groups, heptyl groups or octyl groups; cycloalkyl groups such as cyclopentyl groups or cyclohexyl groups; aralkyl groups such as 2-phenylethyl groups, 2-phenylpropyl groups, 3-phenylpropyl groups; aryl groups such as phenyl groups or tolyl groups; alkenyl groups such as vinyl groups or allyl groups; halogen-substituted hydrocarbon groups such as chloromethyl groups or γ-chloropropyl groups or 3,3,3-trifluoropropyl groups; substituted hydrocarbon groups such as γ-methacryloxypropyl groups, γ-glycidyloxypropyl groups, 3,4-epoxycyclohexylethyl groups or γ-mercaptopropyl groups. Among them, alkyl groups and phenyl groups having 1 to 4 carbon atoms are preferred because they are easily synthesized or easily available.

$R^5$ is not specifically limited, but alkyl groups having 1 to 4 carbon atoms are used as a main material.

Particularly, examples of the tetraalkoxysilane (in which n=0) include tetramethoxysilane, tetraethoxysilane and the like. Examples of the organotrialkoxysilane (in which n=1) include methyltrimethoxysilane, methyltriethoxysilane, methyltriisopropoxysilane, phenyltrimethoxysilane, phenyltriethoxysilane, 3,3,3-trifluoropropyltrimethoxysilane, etc. Further, examples of the diorganodialkoxysilane (in which n=2) include dimethyldimethoxysilane, dimethyldiethoxysilane, diphenyldimethoxysilane, diphenyldiethoxysilane, methylphenyldimethoxysilane and the like.

These $R^5$ and $R^6$ may be the same or different among silica compounds (E1) to (E3).

The above-mentioned organosiloxane (E) can be prepared, for example, by diluting the raw materials (E1) to (E3) with a suitable solvent, adding the necessary amount of water and a catalyst as a curing agent thereto, and conducting hydrolysis and polycondensation to prepare a prepolymer. At this occasion, the weight-average molecular weight of the resulting prepolymer is adjusted to 800 or more, preferably 850 or more, more favorably 900 or more, in terms of polystyrene. At this occasion, it is adjusted so that the upper limit of the molecular weight is not more than 50,000, preferably 45,000, more favorably 40,000. If the distribution of molecular weight of the prepolymer (the weight-average molecular weight (Mw)) is less than 800, the cure shrinkage at the time of the polycondensation of the functional coating material is large, and therefore, crack is liable to occur on the coating after curing. Further, if the molecular weight is more than 50,000, the time for the curing reaction is required, which may result in an insufficient hardness of the coating.

The amount of raw materials (E1) to (E3) to be used at the time of preparing organosiloxane (E) is 5 to 30,000 parts by weight (preferably 10 to 25,000 parts by weight, more favorably 20 to 20,000 parts by weight) of (E1), 0 to 60 parts by weight (preferably 0 to 40 parts by weight, more favorably 0 to 30 parts by weight) of (E3), based on 100 parts by weight of (E2). If the amount of (E1) used is less than the above range, there is a problem that the desired hardness of the cured coating is not obtained (the hardness is lowered). On the other hand, if it is more than the above range, the crosslinking density of the cured coating is too high, therefore, there is a problem that crack is liable to occur. Further, if the amount of (E3) used is more than the above range, there is a problem that the desired hardness of the cured coating is not obtained (the hardness is lowered).

Colloidal silica which can be used as a material (E1) is not specifically limited. For example, water-dispersed or non-aqueous organic solvent (e.g., alcohol)-dispersed colloidal silica can be used. In general, such colloidal silica contains 20 to 50% by weight of silica as a solid content. From this value, the amount of silica to be formulated can be determined. Further, when using water-dispersed colloidal silica, water existing as a component other than the solid content can be used as a curing agent as described bellow. Water-dispersed colloidal silica is usually made from water-glass, but it can be easily obtained as a commercially available product. Furthermore, organic solvent-dispersed colloidal silica can be easily prepared by replacing the water in the above-mentioned water-dispersed colloidal silica with an organic solvent. Such organic solvent-dispersed colloidal silica can be easily obtained as a commercially available product. In the organic solvent-dispersed colloidal silica, the kind of the organic solvent, in which colloidal silica is dispersed, is not specifically limited. Examples thereof include lower aliphatic alcohols such as methanol, ethanol, isopropanol, n-butanol or isobutanol; ethylene glycol derivatives such as ethylene glycol, ethylene glycol monobutyl ether or ethylene acetate glycol monoethyl ether; diethylene glycol derivatives such as diethylene glycol or diethylene glycol monobutyl ether; and diacetone alcohols, etc. One or two or more solvents selected from the above groups can be used. Together with these hydrophilic organic solvents, toluene, xylene, ethyl acetate, butyl acetate, methyl ethyl ketone, methyl isobutyl ketone, methyl ethyl ketoxime and the like can also be used.

Further, water is used as a curing agent at the time of the hydrolytic polycondensation reaction. The amount of water is preferably 0.01 to 3.0 mol, more favorably 0.3 to 1.5 mol, based on 1 mol equivalent of $OR^5$ groups of silica compounds (E1) to (E3).

A diluting solvent to be used at the time of the hydrolytic polycondensation reaction of raw materials (E1) to (E3) is not specifically limited. For example, those which were described as a dispersing solvent of colloidal silica can be used.

Further, a pH value of the above-mentioned organosiloxane (E) is not specifically limited. It is preferred to adjust it in the range between 3.8 and 6. If the pH value is within this range, it is possible to use organosiloxane (E) stably within the above-mentioned molecular weight. When the pH value is out of the above range, the stability of organosiloxane (E) is deteriorated, therefore, the available term after a paint is prepared is limited. Herein, a method of adjusting a pH value is not specifically limited. For example, if the pH value is less than 3.8 at the time of mixing raw materials of organosiloxane (E), the pH value is adjusted to within the above-mentioned range using a basic reagent such as ammonia. If the pH value exceeds 6, it may be adjusted using an acidic reagent such as hydrochloric acid. Further, depending on the pH value, the molecular weight remains small and the reaction does not proceed, therefore, it takes a long time to reach the above-mentioned range of the molecular weight. In that case, organosiloxane (E) may be heated to accelerate the reaction. Further, after making the reaction proceed using an acidic reagent to reduce the pH value, the pH value may be increased to the predetermined value using a basic reagent.

It is not necessary that a functional coating material (1) contains a curing catalyst when it is cured by heating; however, the functional coating material (1) may optionally contain such a catalyst in order to accelerate the heat-curing of an applied coating or to cure the applied coating at a normal temperature by accelerating the polycondensation reaction of organosiloxane (E). The curing catalyst is not specifically limited. Examples thereof include alkyl titanates; metal salts of carboxylic acid such as tin octylate, dibutyltin dilaurate or dioctyltin dimaleate; amine salts such as dibutylamine-2-hexoate, dimethylamine acetate or ethanolamine acetate; quaternary ammonium salts of carboxylic acid such as tetramethylammonium acetate; amine salts such as tetraethylpentamine; amine-type silane coupling agents such as N-β-aminoethyl-γ-aminopropyltrimethoxysilane or N-β-aminoethyl-γ-aminopropylmethyldimethoxysilane; acids such as p-toluenesulfonic acid, phthalic acid or hydrochloric acid; aluminum compounds such as aluminum chelate; alkali metal salts such as lithium acetate, potassium acetate, lithium formate, sodium formate, potassium phosphate or potassium hydroxide; titanium compounds such as tetraisopropyl titanate, tetrabutyl titanate or titanium tetraacetyl acetonate; halogenated silanes such as methyl trichlorosilane, dimethyldichlorosilane or trimethylmonochlorosilane. However, in addition to them, other curing catalysts may be contained as long as they are useful for the acceleration of the condensation reaction of organosiloxane (E).

When the functional coating material (1) also contains a curing catalyst (C), it is preferable to use not more than 25% by weight, more favorably not more than 20% by weight of the curing catalyst, based on the solid content of the whole condensate of organosiloxane (E). If it is more than 45% by weight, storage stability of the coating solution may be deteriorated.

The photocatalyst to be used as Component (F) for functional coating materials (1) and (2) (a photocatalyst (F)) is not specifically limited. Examples thereof include oxides such as titanium oxide, zinc oxide, tin oxide, zirconium oxide, tungsten oxide, chromium oxide, molybudenum oxide, iron oxide, nickel oxide, ruthenium oxide, cobalt oxide, copper oxide, manganese oxide, germanium oxide, lead oxide, cadmium oxide, vanadium oxide, niobium oxide, tantalum oxide, rhodium oxide or rhenium oxide. Among them, titanium oxide, zinc oxide, tin oxide, zirconium oxide, tungsten oxide, iron oxide, niobium oxide are preferred because they show activity even if the bake-curing is conducted at a low temperature of not more than 100° C. The particularly preferred is titanium oxide. If the transparency of the coating is needed, it is preferred that the average diameter of the primary particle is not more than 50 μm, more favorably not more than 5 μm, most favorably not more than 0.5 μm. One photocatalyst may be used for the photocatalyst (F). Also, two or more catalyst may be used in combination thereof.

It is known that a photocatalyst generates active oxygen (photocatalytic properties) when ultraviolet is irradiated in the atmosphere. The active oxygen can oxidize and decompose organic substances. Therefore, utilizing the properties of such a catalyst, a self-cleaning effect of the decomposition of dirt originating in carbon, which is adhered to a coated product, (e.g., a carbon component contained in the exhaust gas of an automobile, nicotine of tobacco); a deodorizing effect of the decomposition of a malodorous component represented by an amine compound and an aldehyde compound; and an antifungal effect of the prevention of the generation of bacteria represented by *Escherichia coli* and *Staphylococcus aureus* and the like can be obtained. Further, dirt such as water repellant organic substances adhered to the surface of a coating is decomposed and removed by the photocatalyst (F). Thereby, there is an effect that wettability of the coating to water is improved. This effect is exhibited regardless of the size of the coating thickness or the amount of the photocatalyst contained therein.

The photocatalyst (F) may be the one in which a metal is incorporated. The metal to be incorporated is not specifically limited. Examples thereof include gold, silver, copper, iron, zinc, nickel, cobalt, platinum, ruthenium, palladium, rhodium, cadmium and the like. Among them, one or two or more can be suitably used. By the incorporation of the metal, the charge separation of the photocatalyst (F) is accelerated. Therefore, the photocatalytic function is exhibited more effectively. The photocatalyst (F) in which a metal is incorporated has an oxidizing ability in the presence of light. By this oxidizing performance, the deodorizing effector antifungal effect is exhibited. Further, a clay crosslinking material in which the photocatalyst (F) is incorporated between layers. By introducing the photocatalyst between the layers, fine particles are incorporated in the photocatalyst (F) to improve the photocatalytic performance.

The method for dispersing the photocatalyst (F) in the functional coating material (1) or (2) is not specifically limited.

A silica-dispersed organosilane oligomer solution (A) to be used as Component (A) in the acryl-modified silicone resin coating material or the functional coating material (2) is a main component of a base polymer having a hydrolytic group (X) as a functional group which is involved with the curing reaction at the time of forming a cured coating. This can be obtained, for example, by adding one or two or more hydrolytic organosilane compounds represented by the general formula (I) to the colloidal silica dispersed in an organic solvent or water (a mixture of the organic solvent and water may be included) and partially hydrolyzing the hydrolytic organosilane, under the condition that 0.001 to 0.5 mol of water (water which may be contained in the colloidal silica beforehand and/or added separately.) is used based on 1 mol equivalent of the above-mentioned hydrolytic group (X).

$R^1$ represented by the above-mentioned general formula (I) in the hydrolytic organosilane is not specifically limited as long as it is substituted or nonsubstituted hydrocarbon group having 1 to 8 carbon atoms. $R^1$ may be the same or different. Examples thereof include alkyl groups such as methyl groups, ethyl groups, propyl groups, butyl groups, pentyl groups, hexyl groups, heptyl groups or octyl groups; cycloalkyl groups such as cyclopentyl groups or cyclohexyl groups; aralkyl groups such as 2-phenylethyl groups, 2-phenylpropyl groups, 3-phenylpropyl groups; aryl groups such as phenyl groups or tolyl groups; alkenyl groups such as vinyl groups or allyl groups; halogen-substituted hydrocarbon groups such as chloromethyl groups or γ-chloropropyl groups or 3,3,3-trifluoropropyl groups; substituted hydrocarbon groups such as γ-methacryloxypropyl groups, γ-glycidyloxypropyl groups, 3,4-epoxycyclohexylethyl groups or γ-mercaptopropyl groups. Among them, alkyl groups having 1 to 4 carbon atoms and phenyl groups are preferred because they are easily synthesized or easily available.

In the above-mentioned general formula (I), the hydrolytic group X is not specifically limited. For example, an alkoxy group, an acetoxy group, an oxime group, an enoxy group, an amino group, an aminoxy group, an amide group and the like are included. Among them, an alkoxy group is preferred because it is easily available and a silica-dispersed organosilane oligomer solution (A) is easily prepared.

Examples of the above-mentioned hydrolytic organosilane include those which are represented by the above general formula (I) wherein m is an integer of 0 to 3, i.e., such as those having a mono-, di-, tri- or tetra-functionality. Concrete examples thereof include alkoxysilanes, acetoxysilanes, oximesilanes, enoxysilanes, aminosilanes, aminoxysilanes, amidesilanes and the like. Among them, the preferred are alkoxysilanes because they are easily available and a silica-dispersed organosilane oligomer solution (A) is easily prepared.

Among alkoxysilnes, particularly, examples of tetraalkoxysilanes wherein m=0 include tetramethoxysilane, tetraethoxysilane and the like. Examples of the organotrialkoxysilane wherein m=1 include methyltrimethoxysilane, methyltriethoxysilane, methyltriisopropoxysilane, phenyltrimethoxysilane, phenyltriethoxysilane, 3,3,3-trifluoropropyltrimethoxysilane and the like. Further, examples of the diorganodialkoxysilane wherein m=2 include dimethyldimethoxysilane, dimethyldiethoxysilane, diphenyldimethoxysilane, diphenyldiethoxysilane, methyl phenyl dimethoxysilane and the like. Examples of the triorganoalkoxysilane wherein m=3 include trimethylmethoxysilane, trimethylethoxysilane, trimethylisopropoxysilane, dimethylisobutylmethoxysilane and the like. Further, those which are generally referred to as silane coupling agents are included in alkoxysilanes.

Among these hydrolytic organosilanes represented by the above-mentioned general formula (I), 50 mole % or more, preferably 60 mol % or more, more favorably 70 mol % or more, may be those having a tri-functionality wherein m=1. If it is less than 50 mol %, the sufficient coating hardness cannot be obtained, and also, the dry curability tends to be inferior.

Colloidal silica contained in Component (A) has an effect of enhancing hardness of cured coating of the coating material and improving smoothness and crack-arresting ability. The colloidal silica is not specifically limited. For example, those mentioned as a raw material (E1) of organosiloxane (E) can be used. When using water-dispersed colloidal silica, water, which is present as a component other than the solid content, can be used for the hydrolysis of the above-mentioned hydrolytic organosilane. Also, it can be used as a curing agent of the coating material.

In Component (A), colloidal silica is contained, as a silica content, preferably in an amount of 5 to 95% by weight, more favorably 10 to 90% by weight, most favorably 20 to 80% by weight, based on the solid content of the whole condensate of organosilane (I). When the content is less than 5% by weight, the desired coating hardness is not likely to be obtained. On the other hand, when it exceeds 95% by weight, uniform dispersion of silica is difficult, which may cause various problems such as the gelation of Component (A), or the frequent occurrence of crack in the cured coating because it is too hard.

Further, in the present specification, the formulation ratio of Component (A) in the coating material is a value including a dispersion medium of colloidal silica.

The amount of water to be used at the time of preparing a silica-dispersed organosilane oligomer solution (A) is 0.001 to 0.5 mol, preferably 0.01 to 0.4 mol, based on 1 mol equivalent of the hydrolytic group (X) that the above-mentioned hydrolytic organosilane has. If the amount of water to be used is less than 0.001 mol, a sufficiently partially hydrolyzed compound is not obtained. If it exceeds 0.5 mol, the stability of the partially hydrolyzed compound is deteriorated. Herein, the above-mentioned amount of water used in the partial hydrolytic reaction of the hydrolytic organosilane is the amount of water which is separately added when using the colloidal silica containing no water (e.g., the colloidal silica in which an organic solvent alone is used as a dispersion medium). When using colloidal silica containing water (e.g., the colloidal silica in which water alone or a mixture of water and an organic solvent is used as a dispersion medium), the above-mentioned amount of water is the amount of water which is contained in the colloidal silica beforehand plus at least the amount of water which is contained in the colloidal silica along with the separately added water. If the amount of water contained in the colloidal silica beforehand alone satisfies the above-mentioned amount to be used, it is not necessary to add water separately. However, if the amount of water contained in the colloidal silica beforehand alone does not satisfy the above-mentioned amount to be used, it is necessary to add water separately until the amount of water satisfies the above-mentioned amount to be used. In that case, the amount of the above-mentioned water to be used is the total amount of the water contained in the colloidal silica beforehand and the water which is added separately. Further, even if the water contained in the colloidal silica alone satisfies the above-mentioned amount to be used, water may be added separately. In that case, the amount of the above-mentioned water to be used is also the total amount of the water contained in the colloidal silica beforehand and the water which is added separately. However, water is added separately so that the total amount does not exceed the above-mentioned upper limit (0.5 mol based on 1 mol equivalent of the hydrolytic group (X)).

The method for conducting partial hydrolysis of hydrolytic organosilane is not specifically limited. For example, hydrolytic organosilane and colloidal silica may be mixed (when no water is contained or the necessary amount of water is not contained in the colloidal silica, water is added to that). In that case, partial hydrolytic reaction proceeds at room temperature. In order to accelerate the partial hydrolytic reaction, the mixture may be optionally heated (e.g., at 60 to 100° C.) or a catalyst may be used. This catalyst is not specifically limited. One or two or more organic acids and inorganic acids, such as hydrochloric acid, acetic acid, halogenated silane, chloroacetic acid, citric acid, benzoic acid, dimethylmalonic acid, formic acid, propionic acid, glutaric acid, glycolic acid, maleic acid, malonic acid, toluenesulfonic acid or oxalic acid, can be used.

It is preferred that a pH value of Component (A) is from 2.0 to 7.0, more favorably 2.5 to 6.5, most favorably 3.0 to 6.0, in order to obtain its performance stably for a long period of time. If the pH value is out of this range, particularly, when the amount of water to be used is 0.3 mol or more, based on 1 mol equivalent of the hydrolytic group (X), the performance of Component (A) is not maintained and it is remarkably deteriorated. If the pH value of Component (A) is out of the above-mentioned range, e.g., if it is in the acidic side from this; range, a basic reagent such as ammonia or ethylenediamine may be added to adjust the pH value. If it is in the basic side from this range, an acidic reagent such as hydrochloric acid, nitric acid or acetic acid may be added to adjust the pH value. However, the adjusting method is not specifically limited.

A silanol group-containing polyorganosiloxane (B) to be used as the Component (B) in an acryl-modified silicone resin coating material and a functional coating material (2) is a crosslinking agent for forming a three-dimensional crosslinking structure in a cured coating by the condensation reaction with Component (A), which is a base polymer having a hydrolytic group serving as a functional group in the curing reaction. Component (B) has an effect of absorbing the distortion due to the cure shrinkage of Component (A) and preventing the occurrence of crack.

$R^2$ in the above-mentioned average compositional formula (II) representing (B) is not specifically limited, and the same groups as $R^1$ in the above-mentioned formula (I) are exemplified. Preferred examples thereof include substituted hydrocarbon groups such as alkyl groups having 1 to 4 carbon atoms, phenyl groups, vinyl groups, γ-glycidyloxypropyl groups, γ-methacryloxypropyl groups, γ-aminopropyl groups or 3,3,3-trifluoropropyl groups. More favorably, methyl groups and phenyl groups are included. Further, in the above-mentioned formula (II), a and b are numbers which separately satisfy the above-mentioned condition. If a is less than 0.2 or b is more than 3, there is trouble such as the occurrence of crack in the cured coating. Further, if a is more than 2 and less than 4, or b is less than 0.0001, the curing does not proceed favorably.

The silanol group-containing polyorganosiloxane (B) is not specifically limited. For example, it can be obtained by hydrolyzing, for example, methyltrichlorosilane, dimethyldichlorosilane, phenyltrichlorosilane, diphenyldichlorosilane, or a mixture of one or 2 or more alkoxysilanes corresponding to the above-mentioned compounds, using a large amount of water according to a known method. The polyorganosiloxane thus obtained is adjusted so that it has an average-molecular weight (Mw) in terms of polystyrene of 700 to 20,000, preferably 750 to 18,000, more favorably 800 to 16,000.

In order to obtain the silanol group-containing polyorganosiloxane (B), when an alkoxysilane is hydrolyzed according to a known method, the small amount of alkoxy groups which are not hydrolyzed may remain. Namely, polyorganosiloxane containing both silanol groups and the very small amount of alkoxy groups is sometimes obtained. In the present invention, such polyorganosiloxane may be used.

A curing agent (C) to be used as Component (C) in an acryl-modified silicone resin coating material and a functional coating material (2) accelerates the condensation reaction of Component (A) with Component (B) to cure the coating. Examples of the curing catalyst (C) include all of those which may be optionally contained in the functional coating material (1) mentioned above. However, the curing catalyst (C) is not specifically limited as long as it is useful for the acceleration of the condensation reaction of Component (A) with Component (B), in addition to the above-mentioned catalysts.

Acrylic resin (D) contained in the acryl-modified silicone resin coating material, which is to be used as Component (D), has an effect of improving the toughness of the cured coating made of the acryl-modified silicone resin coating material. Thereby, the occurrence of crack is prevented and it makes it possible to thicken the coating. Further, the acrylic resin (D) is incorporated into a crosslinking condensate of Component (A) and Component (B), which is to be a three-dimensional bone structure of the cured coating made of the acryl-modified silicone resin coating material, to make the crosslinking condensate acryl-modified. When the above-mentioned crosslinking condensate is acryl-modified, the adhesion properties between the cured coating made of the acryl-modified silicone resin coating material and the substrate are improved. Both the cured coating made of the acryl-modified silicone resin coating material and that made of the functional coating material (1) or 2) are silicone resin cured products having a polysiloxane structure, therefore, the adhesion properties between both of the coatings are high. For that reason, between the cured coating of the functional coating material (1) or (2) and the substrate, a cured coating made of the acryl-modified silicone resin coating material having high adhesion properties to them is to be interposed, which eventually improves the adhesion properties between the cured coating of the functional coating material (1) cr (2) and the substrate. Further, the acryl-modified silicone resin shows high weathering resistance and durability, therefore, it is not influenced by a photocatalyst contained in the functional coating materials (1) and (2), which are on the upper layer.

Examples of the first (meth)acrylate in the above-mentioned formula (III), which is one of the compositional monomers of the acrylic resin (D), include the ones in which $R^4$ is represented by at least one substituted or nonsubstituted monovalent hydrocarbon group having 1 to 9 carbon atoms, for example, alkyl groups such as methyl group, ethyl group, n-propyl group, i-propyl group, n-butyl group, i-butyl group, sec-butyl group, tert-butyl group, pentyl group, hexyl group, heptyl group or octyl group; cycloalkyl groups such as cyclopentyl group or cyclohexyl group; aralkyl groups such as 2-phenylethyl group, 2-phenylpropyl group or 3-phenylpropyl group; aryl groups such as phenyl group or tolyl group; halogenated hydrocarbon groups such as chloromethyl group, γ-chloropropyl group or 3,3,3-trifluoropropyl group; hydroxy hydrocarbon groups such as 2-hydroxyethyl group. The preferred are ethyl group, propyl group and butyl group. The first (meth)acrylate in the above-mentioned formula (III) may be a mixture thereof.

Examples of the second (meth)acrylate in the above-mentioned general formula (III), which is another compositional monomers of the acrylic resin (D), include the ones in which $R^4$ is represented by a group selected from the group consisting of epoxy groups, glycidyl groups and hydrocarbon groups (e.g., γ-glycidyloxypropyl groups, etc.) containing at least either of the above. The preferred are epoxy groups and glycidyl groups. The second (meth) acrylate in the above-mentioned formula (III) may be a mixture thereof.

Examples of the third (meth)acrylate in the above-mentioned general formula (III), which is one more another compositional monomers of the acrylic resin (D), include the ones in which $R^4$ is represented by a hydrocarbon group containing an alkoxysilyl group and/or a halogenated silyl group, the hydrocarbon group being exemplified by trimethoxysilylpropyl group, dimethoxymethylsilylpropyl group, monomethoxydimethylsilylpropyl group, triethoxysilylpropyl group, diethoxymethylsilylpropyl group, ethoxydimethylsilylpropyl group, trichlorosilylpropyl group, dichloromethylsilylpropyl group, chlorodimethylsilylpropyl group, chlorodimethoxysilylpropyl groupsb and dichloromethoxysilylpropyl groups. The preferred are trimethoxysilylpropyl groups, dimethoxysilylpropyl group and triethoxysilylpropyl group. The third (meth)acrylate in the above-mentioned formula (III) may be a mixture thereof.

The acrylic resin (D) is a (meth)acrylate copolymer of at least three kinds of monomers comprising at least one of the first (meth)acrylates, at least one of the second (meth) acrylates and the at leastr one of third (meth)acrylates. The acrylic resin (D) may be a copolymer further containing one or two or more methacrylates selected from the above-mentioned first, second and third methacrylates, or it may also be a copolymer further containing one or two or more methacrylates selected from those other than the above-mentioned methacrylates.

The above-mentioned first (meth)acrylate is an essential component for improving the toughness of the cured coating of the acryl-modified silicone resin coating material. Further, it also has an effect of improving the compatibility between Component (A) and Component (B). In order to obtain a greater effect of them, it is preferred that the substituted or nonsubstituted hydrocarbon group of $R^4$ has a volume at least to some degree. Therefore, the number of carbon atoms is preferably 2 or more.

The second (meth)acrylate is an essential component for improving the adhesion properties between the cured coating made of the acryl-modified silicone resin coating material and the substrate.

The third (meth)acrylate forms a chemical bond between the acrylic resin (D) and Components (A) and (B) at the time of curing the coating made of the acryl-modified silicone resin coating material. Thereby, the acrylic resin (D) is set in the cured coating. Further, the third (meth)acrylate also has an effect of improving the compatibility between the acrylic resin (D) and Components (A) and (B).

The molecular weight of the acrylic resin (D) greatly relies on the compatibility between the acrylic resin (D) and Components (A) and (B). When the weight-average molecular weight of the acrylic resin (D) exceeds 50,000 in terms of polystyrene, phase separation occurs, and the whitening of the coating may occur. Accordingly, it is preferred that the weight-average molecular weight of the acrylic resin (D) is not more than 50,000 in terms of polystyrene. Further, it is preferred that the lower limit of the weight-average molecular weight of the acrylic resin (D) is 1,000 in terms of polystyrene. If the molecular weight is less than 1,000, the toughness of the coating is deteriorated, and crack is liable to occur, which is not preferred.

It is preferred that the second (meth)acrylate is contained in the copolymer of the acrylic resin (D) in a monomer molar ratio of 2% or more. If it is less than 2%, the adhesion properties of the coating tends to be insufficient.

It is preferred that the third (meth)acrylate is contained in the copolymer in a monomer molar ratio of 2 to 50%. If it is less than 2%, the compatibility between the acrylic resin (D) and Components (A) and (B) is poor and the whitening of the coating may occur. On the other hand, if it is more than 50%, the bonding density is too high, and therefore there tends to be no apparent improvement in the toughness, an improvement of which is an original object of the acrylic resin.

The synthesis of the acrylic resin (D) can be conducted, for example, by a solution polymerization method in an organic solvent, an emulsion polymerization method, a radical polymerization method, a suspension polymerization method, an anion polymerization method, a cation polymerization method or the like. However it is not limited to the above.

In the radical polymerization method using solution polymerization, it is conducted according to a known method. For example, the above-mentioned first, second third (meth)acrylate monomers are dissolved in an organic solvent in a reaction container. Further, a radical polymerizing agent is added to that. Then, the mixture is heated under a nitrogen atmosphere and reacted. The organic solvent to be used is not specifically limited. Examples thereof include toluene, xylene, ethyl acetate, butyl acetate, methyl ethyl ketone, methyl isobutyl ketone, ethylene glycol monobutyl ether, diethylene glycol monobutyl ether, ethylene acetate glycol monoethyl ether and the like. Further, the radical polymerizing agent is not specifically limited. For example, cumene hydroperoxide, tert-butyl hydroperoxide, dicumyl peroxide, di-tert-butyl peroxide, benzoyl peroxide, acetyl peroxide, lauroyl peroxide, azobisisobutyronitrile, hydrogen peroxide-Iron$^{2+}$ salt, persulfate-$NaHSO_3$, cumene hydroperoxide-Iron$^{2+}$ salt, benzoyl peroxide-dimethylaniline, peroxide-triethyl aluminum and the like are used. In order to control the molecular weight, a chain transfer agent can be added. The chain transfer agent is not specifically limited. Examples thereof include quinones such as monoethyl hydroquinone or p-benzoquinone; thiols such as mercaptoacetic acid-ethyl ester, mercaptoacetic acid-n-butyl ester, mercaptoacetic acid-2-ethyl hexyl ester, mercaptocyclohexane, mercaptocyclopentane or 2-mercaptoethanol; thiophenols such as di-3-chlorobenzene thiol, p-toluene thiol or benzene thiol; thiol derivatives such as γ-mercaptopropyltrimethoxysilane; phenylpycrylhydrazine; diphenylamine; tert-butyl catechol, etc.

The formulation ratio of the photocatalyst (F) in the functional coating material (1) is not specifically limited because the photocatalytic performance is exhibited regardless of the amount of the photocatalyst. For example, it is preferable to use 90 to 10 parts by weight, more favorably, 50 to 10 parts by weight, based on 10 to 90 parts by weight of the resin solid content of the whole condensate of organosiloxane (E), provided that the total of the resin solid content of (E) and the amount of (F) comes to 100 parts by weight. If the amount of the photocatalyst (F) is less than 10 parts by weight, sufficient photocatalytic performance is not likely to be obtained. If it is more than 90 parts by weight, the coating which is fragile and has no smoothness tends to be obtained.

The formulation ratio of the photocatalyst (F) in the functional coating material (2) is not specifically limited because the photocatalytic performance is exhibited regardless of the amount of the photocatalyst. For example, it is preferable to use 90 to 10 parts by weight, more favorably, 50 to 10 parts by weight, based on 10 to 90 parts by weight of the resin solid content of the whole condensate of the total of Components (A) and (B), provided that the total of the resin solid content of Components (A) and (B) and the amount of (F) comes to 100 parts by weight. If the amount of the photocatalyst (F) is less than 10 parts by weight, there tends to be obtained no sufficient photocatalytic performance. If it is more than 90 parts by weight, the coating which is fragile and has no smoothness tends to be obtained.

The formulation ratio of Components (A) and (B) in the functional coating material (2) is not specifically limited. For example, preferably, 99 to 1 parts by weight of component (B) is used with 1 to 99 parts by weight of Component (A), more favor ably, 95 to 5 parts by weight of Component (B) is used with 5 to 95 parts by weight of Component (A), most favorably, 90 to 10 parts by weight of Component (B) is used with 10 to 90 parts by weight of Component (A) (provided that the total of Components (A) and (B) comes to 100parts by weight). If Component (A) is less than 1 part by weight, the cold-curing properties are poor, or a coating having insufficient hardness is likely to be obtained. On the other hand, if Component (A) is more than 99 parts by weight, the curability of the coating is unstable, or there tends to occur crack on the coating.

The formulation ratio of Component (C) in the functional coating material (2) is not specifically limited. For example, it is preferable to use 0.0001 to 10 parts by weight, more favorably 0.005 to 8 parts by weight, most favorably 0.007 to 5 parts by weight, based on 100 parts by weight of the total of the solid content of the whole condensate of Components (A) and (B). If Component (C) is less than 0.0001 parts by weight, the coating is not likely to be cured at a normal temperature. On the other hand, if it is more than 10 parts by weight, the heat resistance or weathering resistance of the cured coating tends to be deteriorated.

The formulation ratio of Component (C) in the acryl-modified silicone resin coating material is not specifically limited. For example, it is preferable to use 0.001 to 10 parts by weight, more favorably, 0.005 to 8 parts by weight, most favorably 0.007 to 5 parts by weight, based on 100 parts by weight of the total of the solid content of the whole condensate of Components (A), (B) and (C). If Component (C) is less than 0.001 parts by weight, the coating is not likely to be cured at a normal temperature. On the other hand, if it is more than 10 parts by weight, the heat resistance or weathering resistance of the cured coating tends to be deteriorated.

The formulation ratio of Components (A), (B) and (D) in the acryl-modified silicone resin coating material is not specifically limited. For example, when based on the solid content of the whole condensate, preferably, 94 to 1 parts by weight of Component (B) and 5 to 35 parts by weight of Component (D) are used with 1 to 94 parts by weight of Component (A), more favorably, 95 to 5 parts by weight of Component (B) and 5 to 35 parts by weight of Component (D) are used with 5 to 95 parts by weight of Component (A), most favorably, 94 to 10 parts of Component (B) and 5 to 35 parts by weight of Component (D) are used with 10 to 94 parts by weight of Component (A) (provided that the total of Components (A), (B) and (D) comes to 100 parts by weight). If Component (A) is less than 1 part by weight, the cold-curing properties are poor, or there tends to obtain no coating having sufficient hardness. On the other hand, if it is more than 94 parts by weight, the curing properties are unstable or crack is liable to occur on the coating. Further, if Component (D) is less than 5 parts by weight, there tends to be obtained no sufficient toughness or adhesion properties. If Component (D) is more than 35 parts by weight, there is high possibility that the deterioration of the coating may be accelerated due to the photocatalyst in the upper layer.

In the functional coating material (1), a cured coating is formed by the condensation reaction of hydrolytic groups contained in Component (E), by heating at a low temperature or by adding a curing catalyst and leaving them to stand at a normal temperature. Accordingly, the functional coating material (1) is hardly influenced by humidity even if it is cured at a normal temperature. Further, if heat treatment is conducted, condensation reaction can be accelerated without using a curing catalyst and a cured coating can be formed.

In the functional coating material (2), a cured coating is formed by the condensation reaction of a hydrolytic group in the organosilane oligomer, which is contained in Component (A), with a silanol group contained in Component (B), in the presence of a curing catalyst (C), by leaving them to stand at a normal temperature or by heating at a low temperature. Accordingly, the functional coating material (2) is hardly influenced by humidity even if it is cured at a normal temperature. Further, the condensation reaction is accelerated by heat treatment, thus, a cured coating can also be formed.

In the acryl-modified silicone resin coating material, a cured coating is formed by the condensation reaction of a hydrolytic group in the organosilane oligomer, which is contained in Component (A) and a hydrolytic group contained in acrylic resin (D) with a silanol group contained in Component (B), in the presence of a curing catalyst (C), by leaving them to stand at a normal temperature or by heating at a low temperature. Accordingly, the acryl-modified silicone resin coating material is hardly influenced by humidity even if it is cured at a normal temperature. Further, the condensation reaction is accelerated by heat treatment, thus, a cured coating can also be formed.

The acryl-modified silicone resin coating material may optionally contain a pigment. The pigment to be used is not specifically limited. Examples thereof include organic pigments such as carbon black, quinacridone, naphthol red, Cyanine blue, Cyanine green or Hansa yellow; and inorganic pigments such as titanium oxide, barium sulfate, red oxide or composite metal oxide. One or two or more selected from the above may also be used in combination. The method for the dispersion of the pigment is not specifically limited, and it may be conducted by a conventional method, for example, by dispersing pigment powder directly using a Dyno mill, a paint shaker, etc. In that case, it is possible to use a dispersing agent, a dispersing additive, a thickening agent, a coupling agent and the like. The amount of the pigment to be added is not specifically limited because the opacifying properties differ depending on the kind of the pigment. For example, it is preferable to use 5 to 80 parts by weight, more favorably 10 to 60 parts by weight, based on 100 parts by weight of the total of the solid content of the whole condensate of Components (A), (B) and (D). If the amount of the pigment to be added is less than 5 parts by weight, the opacifying properties tend to be deteriorated. If it is more than 80 parts by weight, the smoothness of the coating may be deteriorated.

Further, a levelling agent, a dye, metal powder, glass powder, an anti-fungus agent, an anti-oxidizing agent, an antistatic agent, an ultraviolet absorber and the like may be contained in an inorganic coating material composition as long as they do not adversely affect the effect of the prevent invention.

The respective functional coating materials (1), (2) and the acryl-modified silicone resin coating material may be optionally diluted with various organic solvents because of easy handling. Further, the dilute solution diluted with the above solvents may be used. The kind of the organic solvent can be suitably selected according to mono-valent hydrocarbon groups contained in Components (A), (B), (D) or (E), or to the size of the molecular weight of Components (A), (B), (D) or (E). Such an organic solvent is not specifically limited. Examples thereof include lower aliphatic alcohols such as methanol, ethanol, isopropanol, n-butanol or isobutanol; ehtylene glycol derivatives such as ethylene glycol, ethylene glycol monobutyl ether or ethylene acetate glycol monoethyl ether; diethylene glycol derivatives such as diethylene glycol or diethylene glycol monobutyl ether; and toluene, xylene, hexane, heptane, ethyl acetate, butyl acetate, methyl ethyl ketone, methyl isobutyl ketone, methyl ethyl ketoxime, diacetone alcohol, etc. One or two or more selected from the above can be used in combination. The dilution ratio of the organic solvent is not specifically limited, and it may be suitably decided at need.

The method for applying the respective coating materials to the substrate is not specifically limited. For example, various conventional coating methods such as brushing, spraying, dipping, flow-coating, roll coating, curtain coating, knife coating or spin coating can be selected.

The method for curing the respective coating materials, which are applied to the substrate, is not specifically limited and it may be conducted by known methods. Further, the temperature when curing is not specifically limited, and the temperature in the wide range between a normal temperature and a heated temperature can be taken, according to the desired cured coating performance, whether the curing catalyst is used or not, and the heat resistance of the photocatalyst, etc.

The thickness of the cured coating formed from the functional coating materials (1) or (2) is not specifically limited, because the photocatalytic performance is exhibited regardless of its thickness. For example, the thickness of about 0.01 to 10 μm may be acceptable, but it is preferred that the thickness thereof is 0.05 to 5 μm, more favorably 0.05 to 2 μm, in order to adhere and maintain the cured coating stably for a long period of time and also to prevent crack or peeling.

The thickness of the cured coating formed from the acryl-modified silicone resin coating material is not specifically limited. For example, the thickness of about 0.1 to 100 μm may be acceptable, but it is preferred that the thickness thereof is 0.5 to 50 μm, in order to restrain deterioration of the substrate caused by the photocatalyst, to adhere and maintain the cured coating stably for a long period of time and also to prevent crack or peeling.

The process for producing the functional coated product of the present invention is not specifically limited. For example, the process of the present invention is preferred.

The process of the present invention is conducted, for example, as follows:

First, the acryl-modified silicone coating material is applied to the surface of the substrate as the first, coating layer, and then the first coating layer is semi-cured. After that, the functional coating material (1) or (2) is applied to the surface of this semi-cured coating layer. That is, while the first coating layer is semi-cured, the functional coating material (1) or (2) is applied to that. At this time, if the first coating layer is completely cured before applying the functional coating material (1) or (2), the functional coating material (1) or (2) is peeled off due to the completely cured first coating layer, and therefore a coating cannot be formed. Further, if the functional coating material (1) or (2) is applied while the first coating layer is still wet, the first coating layer causes lifting (the adhesion properties between the first coating layer and the substrate cannot be obtained).

In the present specification "semi-curing" indicates "tack free drying" prescribed in JIS-K5400-1990. It means the condition such that no scratch is marked on the surface of the coating when the center of the coating is gently rubbed with a fingertip. Further, "complete curing" indicates "hard drying" prescribed in JIS-K5400-1990. It means the condition such that no depression due to a fingerprint is marked on the surface of the coating and the movement of the coating is not felt, and also no scratch is marked even when the center of the coating is rubbed fast with the fingertip repeatedly. Furthermore, "the coating layer is still wet" means the condition such that the fingertip is stained when the center of the coating is gently touched with the fingertip.

As mentioned above, after the second coating layer is formed by applying the functional coating material (1) or (2) to the surface of the semi-cured layer made of the acryl-modified silicone resin coating material, these semi-cured coating layer and second coating layer are cured.

Further, the process for obtaining the functional coated product of the present invention is not limited to the production process of the present invention.

The substrate to be used in the present invention is not specifically limited. For example, when using a metallic substrate, an organic substrate and a substrate coated with an organic substance in which either one of the above substrates has a coating formed from an organic substance on the surface thereof, the effect of the improvement in the adhesion properties between the substrate and the coating or the prevention of the deterioration of the substrate is exhibited more clearly. Therefore, the preferred is a substrate selected from the group consisting of a metallic substrate, an organic substrate and a substrate coated with an organic substance in which either one of the above substrates has a coating formed from an organic compound on the surface thereof. However, it should not be construed that the substrate is limited to them. For example, an inorganic substrate other than the metallic substrate and a substrate coated with an organic substance having a coating formed with an organic substance on the surface of the inorganic substrate other than the metallic substrate may also be used.

The inorganic substrate other than the metallic substrate is not specifically limited. Examples thereof include a glass substrate, enamel, a water-glass ornamental plate, an inorganic construction material such as an inorganic cured material, ceramic and the like.

The metallic material is not specifically limited. Examples thereof include non-ferrous metal [e.g., aluminum (JIS-H4000, etc.), aluminum alloy (duralumin, etc.), copper, zinc, etc.], iron, steel [e.g., rolled steel (JIS-G3101, etc.), hot-dip zinc-coated steel (JIS-G3302), (rolled) stainless steel (JIS-G4304, G4305, etc.), etc.], tinplate (JIS-G3303, etc.), and the whole range of other metal (including alloy).

The glass material is not specifically limited. Examples thereof include sodium soda glass, Pyrex glass, quartz glass, no-alkali glass and the like.

The above-mentioned enamel is formed by coating the surface of the metal with an enamel glass agent by means of baking. Examples of the substrate include, a mild steel plate, a steel plate, cast iron, aluminum and the like. However, it is not limited to them. Concerning the enamel agent, conventional ones may be used and it is not specifically limited.

The above-mentioned water-glass ornamental plate indicates an ornamental plate obtained, for example, by applying sodium silicate to a cement substrate such as slate, followed by baking.

The inorganic cured material is not specifically limited. Examples thereof include the whole range of substrates obtained by cure-molding inorganic materials such as a fiber reinforced cement plate (JIS-A5430, etc.), a ceramic siding (JIS-A5422, etc.), a cemented excelsior board (JIS-A5404, etc.), pulp cement flat sheet (JIS-A5414, etc.), slate/excelsior cemented laminated plate (JIS-A5426, etc.) a gypsum board product (JIS-A6901, etc.), a clay roof tile (JIS-A5208, etc.), a thick slate (JIS-A5402), a ceramic tile (JIS-A5209, etc.), a concrete block for construction (JIS-A5406, etc.), terrazzo (JIS-A5411, etc.), prestressed concrete double T slab (JIS-A5412, etc.), an ALC panel (JIS-A5416, etc.), a hollow prestressed concrete panel (JIS-A6511, etc.) or a common brick (JIS-R1250, etc.).

The ceramic material is not specifically limited. Examples thereof include alumina, zirconia, silicon carbide, silicon nitride and the like.

The organic substrate is not specifically limited. Examples thereof include plastic, wood, timber, paper and the like.

The plastic is not specifically limited. Examples thereof include thermosetting or thermoplastic plastics such as polycarbonate resin, acrylic resin, ABS resin, vinyl chloride resin, epoxy resin or phenol resin, and fiber reinforced plastic (FRP) obtained by reinforcing the above plastics with glass fiber, nylon fiber, carbon fiber, etc.

The organic coating forming a substrate coated with an organic substance is not specifically limited. Examples thereof include a cured coating made of a coating material containing organic resin such as acrylic resin, alkyd resin, polyester resin, epoxy resin, urethane resin, acrylsilicone resin, chlorinated rubber resin, phenolic resin or melamine resin.

The form of the substrate is not specifically limited. Examples thereof include a film-shaped, sheet-shaped, plate-shaped, fiber-shaped substrate and the like. Further, the substrate may be a molded material made of the materials of these shapes or a compositional material a part of which has at least one of the molded materials of the above shapes or the compositional materials.

The substrate may be formed from the above-mentioned various materials alone, or it may be a composite material comprising at least two of the above-mentioned various materials or a laminated material comprising the lamination of at least two of the above-mentioned various materials.

The functional coated product of the present invention can be suitably used for the following use, by means of providing at least a part of various materials or products, using various effects originating in the excellent photocatalytic action.

A material or article related to building construction such as a sheathing material (e.g., a material for outside wall, a roof tile such as a flat roof tile, a clay roof tile or a metal roof tile), a rainwater guttering such as a resin rainwater guttering (e.g., a PVC rainwater guttering) or a metal rainwater guttering (e.g., a stainless steel rainwater guttering, etc.), a gate and a material to be used for that (e.g., a gate door leaf, a gate pier, a gate fence, etc.), a fence and a material to be used for that, a garage door leaf, a home terrace, a door, a stanchion, a carport, a cycle port, a sign post, a delivery post, a wiring apparatus such as a switchboard/switch, a gas meter, an interphone, a main body and a camera lens portion of a video intercom, an electric lock, an entrance pole, a porch, an air outlet of a ventilating fan or glass for building construction, a window (an openable window, e.g., a lighting window, a skylighting, a louver, etc.) and a material to be used for that (e.g., a window frame, a weather door, a blind, etc.) an automobile, a railway rolling stock, an aircraft, a marine structure, machine equipment, a material for highway-related construction (e.g., a sound barrier, an interior material for a tunnel, various display equipment, a guardrail, a car stop, a railing, a signboard and a signpost of a traffic-control sign, a traffic light, a post cone, etc.), a post for public notice, an outdoor or indoor lighting fixture and a material to be used for that (e.g., a glass material, a resin material, a metallic material, a ceramic material, etc.), glass for solar battery, agricultural-use vinyl sheets and green house, an outdoor air conditioning unit, an antenna for VHF, UHF, BS, CS, etc.

Further, according to the present invention, the first coating layer and the second coating layer may be directly formed on at least a part of the above-mentioned materials or articles. However, it is not limited to them. For example, the functional coated product of the present invention wherein a base film material is used, namely, the functional coating comprising the first coating layer and the second coating layer formed on the surface of the base film material, may be pasted on at least a part of various materials or articles. Examples of such a film substrate include polyethylene terephthalate (PET) resin poly butylene-terephthalate (PBT) resin, PVC resin, acrylic resin, fluorine plastics, polypropylene (PP) resin, composite resin thereof and the like, but it is not specifically limited.

EXAMPLES

The present invention is explained in detail by the following Examples and Comparative Examples. It is, of course, not the intention hereby to limit the invention. In Examples and Comparative Examples, "part", "%" and "ppm" are all indicate "part by weight", "% by weight" and "ppm by weight", respectively, unless otherwise stated. Further, the measurement of the molecular weight was conducted by means of GPC (gel permeation chromatography) using a measuring apparatus, HLC8020 manufactured by Toso Co., Ltd., to make a calibration curve with standard polystyrene.

EXAMPLES

First, functional coating materials (1), (2), acryl-modified silicone resin coating materials and Comparative coating materials were prepared.

Preparation of a Functional Coating Material (1) and a Comparative Coating Material

Preparation Example 1-1

Into a flask equipped with a stirrer, a warming jacket, a condenser, a dropping funnel and a thermometer were charged 100 parts of methyltrimethoxysilane, 20 parts of tetraethoxysilane, 105 parts of IPA-ST (colloidal silica sol dispersed in isopropanol: a particle diameter of 10 to 20 nm, a solid content of 30%, a water content of 0.5% manufactured by Nissan Kagaku Kogyo Co.), 30 parts of dimethyldimethoxysilane, 100 parts of isopropanol. Thereafter, 100 ppm of hydrochloric acid based on the solid content of the whole condensate (30%) of this solution, and water of 3% on the basis of the above silicon alkoxide, were added to this solution mixture for hydrolysis at 25° C. for 30 minutes while stirring the mixture. After cooling, the silicone coating solution having an average molecular weight of about 1,700 was obtained. To this were added 0.2 parts of lithium formate as a curing catalyst and titanium oxide as a photocatalyst (STS-01 manufactured by Ishihara Sangyo Co., an average particle diameter of 7 nm, a solid content of 30%) so that the weight ratio of the resin solid content of the silicone coating solution to the photocatalyst (resin solid content/photocatalyst) was 80/20. Then, the mixture was diluted with methanol so that the whole solid content was 10% to give a functional coating material (1-1).

Preparation Examples 1-2 to 1-5

Functional coating materials (1-2) to (1-5) were obtained in the same manner as in Example 1, except that the amount of the photocatalyst which was added was changed such that the resin solid content/photocatalyst weight ratio was 60/40, 50/50, 40/60 and 20/80, respectively. Further, the average molecular weight of the organosiloxane was about 1,700 ((1-2) to (1-5)).

Comparative Preparation Example 1

The comparative functional coating material (1) was obtained in the same manner as in Preparation Example 1, except that no photocatalyst was used. The average molecular weight of the organosiloxane was about 1,700.

Preparation of Functional Coating Material (2) and Comparative Coating Material

Prior to the preparation of a coating material, Component (A) and Component (B), which are to be used in the preparation, were prepared by the following method.

Preparation Example A-1

Into a flask equipped with a stirrer, a warming jacket, a condenser and a thermometer were charged 100 parts of IPA-ST (colloidal silica sol dispsesed in isoprppanol: a particle diameter of 10 to 20 nm, a solid content of 30%, a water content of 0.5% manufactured by Nissan Kagaku Kogyo Co.), 68 parts of methyltrimethoxysilane and 2.2 parts of water were charged. Then, the hydrolysis was conducted at 65° C. for 5 hours while stirring the mixture. After cooling, Companent (A-1) was obtained. The solid content of the whole condensate of this component was 37% when it was left to stand at room temperature for 48 hours.

Conditions of the Preparation of A-1

The amount of water based on 1 mol of a hydrolytic groups $(mol)_4$0.1.

The amount of silica contained in Component (A-1) 47.3%

The amount of hydrolytic organosilane in which m=1 (mol %) 100 (mol %)

Preparation Example B-1

A solution in which 220 parts (1 mol) of methyltriisopropoxysilane was dissolved in 150 parts of toluene was charged into a flask equipped with a stirrer, a warming jacket, a condenser, a dropping funnel and a thermometer. To this was added dropwise 108 parts of a 1% solution of hydrochloric acid over 20 minutes to conduct the hydrolysis of methyltriisopropoxysilane at 60° C. under stirring. Forty minutes after the completion of the dropping, the stirring was terminated. The reaction mixture was poured from the flask into a separating funnel, followed by standing. Then, the reaction mixture was separated into two layers. The mixed solution of water and isopropyl alcohol in the underlayer, which contained hydrochloric acid in a small amount, was removed by separation. Then, hydrochloric acid remaining in the residual resin solution of toluene was removed by washing with water. Further, toluene was removed under reduced pressure. Thereafter, the residue was diluted with isopropyl alcohol to obtain a 40% isopropyl alcohol solution of a silanol group-containing polyorganosiloxane having a weight-average molecular weight of about 2,000. This was used as Component (B-1).

Preparation Example 2-1

Component (A-1) and Component (B-1) obtained above were mixed with the following curing catalysts (C-1) and (C-2) in the following ratio. To this was added as a photocatalyst titanium oxide (manufactured by Ishihara Sangyo Co. STS-02, an average particle diameter of 7 nm and a solid content of 30%) so that the weight ratio of the total resin solid content of Components (A-1) and (B-1) to the photocatalyst was 80/20. Thereafter, the mixture was diluted with methanol so that the total solid content was 10% to obtain a functional coating material (2-1).

| | |
|---|---|
| Component (A-1): | 50 parts (solid content: 18.5 parts) |
| Component (B-1): | 50 parts (solid content: 20 parts) |
| Component (C-1): | N-β-aminoethyl-y-aminopropylmethyl |
| Dimethoxysilane: | 2 parts |
| Component (C-2): | dibutiltin dilaurate |
| | 0.4 parts |

Preparation Examples 2-2 to 2-5

The functional coating materials (2-2) to (2-5) were obtained in the same manner as in Preparation Example 2-1, except that the amount of the photocatalyst which was added was changed such that the resin solid content/photocatalyst weight ratio was 60/40, 50/50, 40/60 and 20/80, respectively.

Comparative Preparation Example (2)

The comparative coating material (2) was obtained in the same manner as in Preparation Example 2-1, except that no photocatalyst was used.

Preparation of Acryl-Modified Silicone Resin Coating Material and Comparative Coating Material Prior to the preparation of a coating material, Component (A), Component (B) and Component (D), which were to be used in the preparation, were prepared by the following method.

Preparation Example A-2

Into a flask equipped with a stirrer, a warming jacket, a condenser and a thermometer were charged 100 parts of MA-ST (colloidal silica sol dispersed in methanol: a particle diameter of 10 to 20 nm, a solid content of 30%, a water content of 0.5% manufactured by Nissan Kagaku Kogyo Co.), 68 parts of methyltrimethoxysilane, 49.5 parts of phenyltrimethoxysilane, 16.0 parts of water and 0.1 parts of acetic anhydride. Then, the hydrolysis was conducted at 60° C. for 5 hours while stirring the mixture. After cooling, Companent (A-2) was obtained. The solid content of the whole condensate of this component was 41% when it was allowed to stand for 48 hours at room temperature.

Conditions of the Preparation of A-2

The amount of water based on 1 mol of hydrolytic groups (mol): 0.4

The amount of silica contained in Component (A-2): 31.3%

The amount of hydrolytic organosilane in which m=1: 100 (mol %)

Preparation Example B-2

Into a flask equipped with a stirrer, a warming jacket, a condenser, a dropping funnel and a thermometer were charged 1,000 parts of water and 50 parts of acetone. Further, the hydrolysis was conducted while adding dropwise a solution, in which 44.8 parts (0.3 mol) of methyltrichlorosilane and 84.6 parts (0.4 mol) of phenyltrichlorosilane were dissolved in 200 parts of toluene, to the mixture under stirring at 60° C. Forty minutes after the completion of the dropping, the stirring was terminated. The reaction mixture was poured from the flask into a separating funnel, and then left to stand. Then, the reaction mixture was separated into two layers. Aqueous hydrochloric acid in the under-layer was removed by separation. Then, water and hydrochloric acid remaining in the toluene solution of the residual organopolysiloxane was removed together with the excess amount of toluene by means of reduced-pressure stripping to obtain a 60% toluene solution of silanol group-containing polyorganosiloxane having a weight-average molecular weight of about 3,000. This was used as Component (B-2). It was confirmed that this silanol group-containing polyorganosiloxane in Component (B-2) and Component (B-1) satisfied the above-mentioned average compositional formula Preparation Example D-1

In a flask equipped with a stirrer, a warming jacket, a condenser, a dropping funnel, a nitrogen-introducing/discharging opening and a thermometer, a solution in which 0.025 parts (0.15 mmol) of azobisisobutyronitrile was dissolved in 3 parts of toluene was added dropwise to a reaction solution in which 5.69 parts (40 mmol) of n-butylmethacrylate (BMA), 1.24 parts (5 mmol) of trimethoxysilylpropylmethacrylate (SMA), 0.71 parts (5 mmol) of glycidyl methacrylate (GMA) and further 0.784 parts (4 mmol) of γ-mercaptopropyltrimethoxysilane as a chain transfer agent were dissolved in 8.49 parts of toluene under a nitrogen atmosphere. The mixture was reacted at 70° C. for 2 hours. By this, a polymer having a weight-average molecular weight of 1,000 was obtained. This acrylic resin solution was used as Component (D-1) without any further treatment.

Conditions of the Preparation of D-1

| | |
|---|---|
| The molar ratio of monomers | |
| BMA/SMA/GMA = 8.0/1.0/1.0 | |
| The weight-average molecular weight | 1,000 |
| The solid content | 40% |

Preparation Example D-2

In a flask equipped with a stirrer, a warming jacket, a condenser, a dropping funnel, a nitrogen-introducing/discharging opening and a thermometer, a solution in which 0.025 parts (0.15 mmol) of azobisisobutyronitrile was dissolved in 3 parts of toluene was added dropwise to a reaction solution in which 0.71 parts (5 mmol) of n-butylmethacrylate (BMA), 0.62 parts (2.5 mmol) of trimethoxysilylpropylmethacrylate (SMA), 6.04 parts (42.5 mmol) of glycidyl methacrylate (GMA) and further 0.196 parts (1 mmol) of γ-mercaptopropyltrimethoxysilane as a chain transfer agent were dissolved in 8.06 parts of toluene under a nitrogen atmosphere. The mixture was reacted at 70° C. for 2 hours. By this, a polymer having a weight-average molecular weight of 3,000 was obtained. This acrylic resin solution was used as Component (D-2) without any further treatment.

Condition of the Preparation of D-2

| | |
|---|---|
| The molar ratio of monomers | |
| BMA/SMA/GMA = 1.0/0.5/8.5 | |
| The weight-average moleaular weight | 3,000 |
| The solid content | 40% |

Preparation Example D-3

In a flask equipped with a stirrer, a- warming jacket, a condenser, a dropping funnel, a nitrogen-introducing/ discharging opening and a thermometer, a solution in which 0.025 parts (0.15 mmol) of azobisisobutyronitrile was dissolved in 3 parts of toluene was added dropwise to a reaction solution in which 6.05 parts (42.5 mmol) of n-butylmethacrylate (BMA), 0.62 parts (2.5 mmol) of trimethoxysilylpropylmethacrylate (SMA), 0.71 parts (5 mmol) of glycidyl methacrylate (GMA) and further 0.098 parts (0.5 mmol) of γ-mercaptopropyltrimethoxysilane as a chain transfer agent were dissolved in 8.06 parts of toluene under a nitrogen atmosphere. The mixture was reacted at 70° C. for 2 hours. By this, a polymer having a weight-average molecular weight of 5,000 was obtained. This acrylic resin solution was used as Component (D-3) without any further treatment.

Conditions of the Preparation of D-3

| | |
|---|---|
| The molar ratio of monomers | |
| BMA/SMA/GMA = 8.5/6.5/1.0 | |
| The weight-average molecular weight | 5,000 |
| The solid content | 40% |

Preparation Example D-4

In a flask equipped with a stirrer, a warming jacket, a condenser, a dropping funnel, a nitrogen-introducing/discharging opening and a thermometer, a solution in which 0.025 parts (0.15 mmol) of azobisisobutyronitrile was dissolved in 3 parts of toluene was added dropwise to a reaction solution in which 3.20 parts (22.5 mmol) of n-butylmethacrylate (BMA), 1.24 parts (5 mmol) of trimethoxysilylpropylmethacrylate (SMA), 3.20 parts (22.5 mmol) of glycidyl methacrylate (GMA) and further 0.784 parts (4 mmol) of γ-mercaptopropyltrimethoxysilane as a chain transfer agent were dissolved in 8.46 parts of toluene under a nitrogen atmosphere. The mixture was reacted at 70° C. for 2 hours. By this, a polymer having a weight-average molecular weight of 1,000 was obtained. This acrylic resin solution was used as Component (D-4) without any further treatment. Conditions of the preparation of D-4

| | |
|---|---|
| The molar ratio of monomers | |
| BMA/SMA/GMA = 4.5/1.0/4.5 | |
| The weight-average molecular weight | 1,000 |
| The solid content | 40% |

Preparation Example 3

Component (A-2), Component (B-2) and Component (D-1) obtained above were mixed with the following curing catalysts (C-1) and (C-2) in the following ratio. Thereafter, the mixture was diluted with isopropyl alcohol so that the solid content was 25% to obtain the functional coating material (1).

| | |
|---|---|
| Component (A-2): | 50 parts (solid content: 20.5 parts) |
| Component (B-2): | 50 parts (solid content: 30 parts) |
| Component (C-1): | N-β-aminoethyl-γ-aminopropylmethyldimethoxysilane 2 parts |
| Component (C-2): | dibutyltin dilaurate 0.4 parts |
| Component (D-1): | 20.25 parts (solid content: 8.1 parts) |

Preparation Example 4

The acryl-modified silicone resin coating material (2) was obtained in the same manner as in Preparation Example 3, except that the formulation ratio of Components (A-2), (B-2), (C-1), (C-2) and (D-1) was changed as follows.

Component (A-2): 50 parts (solid content: 20.5 parts)
Component (B-2): 50 parts (solid content: 30 parts)
Component (C-1): 2 parts
Component (C-2): 0.4 parts
Component (D-1): 6 parts (solid content: 2.4 parts)

Preparation Example 5

The acryl-modified silicone resin coating material (3) was obtained in the same manner as in Preparation Example 3, except that the formulation ratio of Components (A-2), (B-2), (C-1), (C-2) and (D-1) was changed as follows.

Component (A-2): 50 parts (solid content: 20.5 parts)
Component (B-2): 50 parts (solid content: 30 parts)
Component (C-1): 2 parts
Component (C-2): 0.4 parts
Component (D-1): 53 parts (solid content: 20 parts)

Comparative Preparation Example 3

The comparative coating material (3) was obtained in the same manner as in Preparation Example 3, except that no Component (D-1) was used.

Preparation Example 6

The acryl-modified silicone resin coating material (4) was obtained in the same manner as in Preparation Example 3, except that Components (A-2) and (B-2) were changed to Components (A-1) and (B-1), respectively, and that the formulation ratio of the respective components was as follows.

Component (A-1): 10 parts (solid content: 3.7 parts)
Component (B-1): 10 parts (solid content: 4 parts)
Component (C-1): 3 parts
Component (C-2): 0.4 parts
Component (D-1): 180 parts (solid content: 72 parts)

Preparation Example 7

The acryl-modified silicone resin coating material (5) was obtained in the same manner as in Preparation Example 3, except that Components (A-2) and (B-2) were changed to Components (A-1) and (B-1), respectively, and that the formulation ratio of the respective components was as follows.

Component (A-1): 50 parts (solid content: 18.5 parts)
Component (B-1): 50 parts (solid content: 20 parts)
Component (C-1): 3 parts
Component (C-2): 0.4 parts
Component (D-1): 50 parts (solid content: 20 parts)

Preparation Example 8

The acryl-modified silicone resin coating material (6) was obtained in the same manner as in Preparation Example 3, except that Components (A-2), (B-2) and (D-1) were changed to Components (A-1), (B-1) and (D-2), respectively, and that the formulation ratio of the respective components was as follows.

Component (A-1): 10 parts (solid content: 3.7 parts)
Component (B-1): 10 parts (solid content: 4 parts)
Component (C-1): 2 parts
Component (C-2): 0.4 parts
Component (D-2): 80 parts (solid content: 32 parts)

Preparation Example 9

The acryl-modified silicone resin coating material (7) was obtained in the same manner as in Preparation Example 3, except that Components (A-2), (B-2) and (D-1) were changed into Components (A-1), (B-1) and (D-2), respectively, and that the formulation ratio of the respective components was as follows.

Component (A-1): 10 parts (solid content: 3.7 parts)
Component (B-1): 10 parts (solid content: 4 parts)
Component (C-1): 3 parts
Component (C-2): 0.4 parts
Component (D-2): 180 parts (solid content: 72 parts)

Preparation Example 10

The acryl-modified silicone resin coating material (8) was obtained in the same manner as in Preparation Example 3, except that Components (A-2), (B-2) and (D-1) were changed to Components (A-1), (B-1) and (D-3), respectively, and that the formulation ratio of the respective components was as follows.

Component (A-1): 10 parts (solid content: 3.7 parts)
Component (B-1): 10 parts (solid content: 4 parts)
Component (C-1): 3 parts
Component (C-2): 0.4 parts
Component (D-3): 180 parts (solid content: 72 parts)

Preparation Example 11

The acryl-modified silicone resin coating material (9) was obtained in the same manner as in Preparation Example 3, except that Components (A-2), (B-2) and (D-1) were changed to Components (A-1), (B-1) and (D-4), respectively, and that the formulation ratio of the respective components was as follows.

Component (A-1): 10 parts (solid content: 3.7 parts)
Component (B-1): 10 parts (solid content: 4 parts)
Component (C-1): 3 parts
Component (C-2): 0.4 parts
Component (D-4): 180 parts (solid content: 72 parts)

Examples 1 to 10 and Comparative Examples 1 and 2

Using a PC (polycarbonate) plate (50 mm×50 mm×2.5 mm) as a substrate, the first applied layer was formed by means of spray coating with the acryl-modified silicone resin coating material (1) prepared in Preparation Example 3 so that the cured coating thickness was 1 μm. Then, the coating was cured at 60° C. for 15 minutes. After that, the setting time was provided for 10 minutes. After the completion of the setting time, the center of the coated surface was strongly pinched with a thumb and an index finger to form depressions on the coated surface due to a fingerprint. Also, the movement of the coating was felt. However, even if the center of the coating was gently rubbed with a fingertip, no scratch was formed on the coated surface. From this results, it was confirmed that the first coating layer-was a semi-cured condition.

The second coating layer was formed by means of spray coating with the functional coating materials (1-1) to (1-5), (2-1) to (2-5) or comparative coating materials (1) and (2) so that the cured coating thickness was 0.5 μm. After that, the second coating layer was allowed to stand at room temperature for one week to obtain functional coated products (1) to (10) and a comparative coated products (1) and (2).

Concerning the functional coated products (1) to (10) and comparative coated products (1) and (2), tests for coating properties and for preventive properties for deterioration were conducted by the following evaluation method.

Evaluation on Coating Properties

Adhesion Properties

Adhesion properties to the substrate were evaluated by the peeling test using adhesive tape having a pattern of squares (cellophane tape was used).

Surface Hardness

It was conducted according to hardness test using a pencil (based on JIS-K5400).

Photocatalytic Action

Into a 300 ml container containing a sample, 50 ppm of acetaldehyde was injected. Black light (10 W) was irradiated to the container for 60 minutes to measure the ratio of the removed aldehyde (%) by means of gas chromatography (GC14A manufactured by Shimazu Seisakusho K.K.).

Wettability to Water

It was evaluated by measuring the contact angle formed by water and the coating. The contact angle was measured when the coating was in the initial stage after preparation, and after the coating was irradiated by UV light for 24 hours using an UV-irradiation device (HANDY UV300 manufactured by OAK FACTORY).

Evaluation on the Deterioration of a Substrate and a Coating

Light was irradiated with a Sunshine Weatherometer (according to JIS-K5400) for 2,500 hours to observe a substrate and a coating. Those which showed no change were evaluated to be good.

Evaluation results were shown in Tables 1 and 2. As shown in these tables, in the second coating layer, the more the content of titanium oxide, which was used as a photocatalyst, the better photocatalytic performance was exhibited. However, the hardness is somewhat deteriorated if the ratio of titanium oxide is 80% or more. Further, the adhesion properties between the substrate and the first coating layer, those between the first coating layer and the second coating layer were good. Further, concerning the functional coated products (1) to (10), sufficient photocatalytic performance was exhibited although the second coating layer containing the photocatalyst was cured at room temperature. Concerning wettability of the coating, after the irradiation of UV light, every functional coated product had a contact angle of a few degree regardless of the amount of the photocatalyst contained in the coating layer, which showed high wettability. Furthermore, concerning the functional coated products (1) to (10) having a coating layer containing the photocatalyst, although a PC plate, which is easily subjected to the deterioration due to the photocatalyst, was used, the deterioration of the substrate was sufficiently prevented by interposing a coating layer made of the acryl-modified silicone resin coating material between the coating containing the photocatalyst and the substrate. Further, the deterioration of the coating was not observed, either.

Comparative Example 3

A comparative coated product (3) was obtained in the same manner as in Example 1, except that the second coating layer was formed only with titanium oxide instead of forming a cured coating of the functional coating material.

Concerning the comparative coated product (3), the evaluation on coating properties and deterioration of the substrate and the coating were conducted according to the above-mentioned method.

The results thereof were shown in Table 3. As shown in this table, photocatalytic performance was very good, however, the coating of the second coating layer was fragile because the second coating layer comprises sol only. Therefore, the first coating layer and the second coating layer were not adhered. Also, it was not easy to measure the hardness. Concerning the deterioration of the substrate, yellowing was seen on the PC plate.

Comparative Example 4

A comparative coated product (4) was obtained in the same manner as in Example 3, except that the first coating layer was formed with a cured coating made of a comparative coating material (3) containing no Component (D), instead of forming a cured coating made of the acryl-modified silicone resin coating material (1).

Concerning the comparative coated product (4), the evaluation on coating properties and deterioration of the substrate and the coating were conducted according to the above-mentioned method.

The results thereof were shown in Table 3. As shown in this table, adhesion properties between the substrate and the first coating layer were not obtained. There was no problems concerning the deterioration of the substrate and the coating.

Comparative Example 5

A comparative coated product (5) was obtained in the same manner as in Example 3, except that the functional coating material (1-3) was directly applied to the surface of the substrate without using the acryl-modified silicone resin coating material and that the curing was conducted.

Concerning the comparative coated product (5), the evaluation on coating properties and deterioration of the substrate and the coating were conducted according to the above-mentioned method.

The results thereof were shown in Table 3. As shown in this table, adhesion properties between the substrate and the cured coating of the functional coating material were not obtained. Further, the substrate was deteriorated due to the action of the photocatalyst contained in the cured coating of the functional coating material.

Comparative Example 6

A comparative coated product (6) was obtained in the same manner as in Comparative Example 1, except that the comparative functional coating material (1) was directly applied to the surface of the substrate without using the acryl-modified silicone resin coating material and that the curing was conducted.

Concerning the comparative coated product (6), the evaluation on coating properties and deterioration of the substrate and the coating were conducted according to the above-mentioned method.

The results thereof were shown in Table 3. As shown in this table, the deterioration of the substrate and the coating was not observed, however, adhesion properties between the substrate and the cured coating formed with the coating material were not obtained.

Examples 11 to 13

Examples of Colored Coating

Functional coated products (11) to (1.3) were obtained in the same manner as in Example 3, except that the first coating layer was formed with enamel obtained by adding the following pigments (1) to (3) to the acryl-modified silicone resin coating material (1), instead of the acryl-modified silicone resin coating material (1) which was used for forming the first coating layer.

Pigment 1: White pigment (manufactured by Ishihara Sangyo Co., Ltd.) P.W.C.40

Pigment 2: Yellow pigment (manufactured by Dainichi Seika Co., Ltd.) P.W.C.40

Pigment 3: Black pigment (manufactured by Dainichi Seika Co., Ltd.) P.W.C.40

P.W.C.: Pigment Weight Concentration (Weight % in the solid content)

Examples 14 to 16

Examples of Colored Coating

Functional coated products (14) to (16) were obtained in the same manner as in Example 8, except that the first coating layer was formed with enamel obtained by adding the above-mentioned pigments (1) to (3) to the acryl-modified silicone resin coating material (1), instead of the acryl-modified silicone resin coating material (1) which was used for forming the first coating layer.

Concerning the functional coated products (11) to (16), the evaluation on coating properties and deterioration of the substrate and the coating were conducted according to the above-mentioned method.

The results thereof were shown in Table 4. As shown in this table, there was no problem concerning the coating properties and the deterioration of the substrate and the coating, even if the first coating layer was coated by means of enamel coating.

Example 17

A functional coated product (17) was obtained in the same manner as in Example 3, except that the thickness of the cured coating of the second coating layer was changed to 0.1 μm.

Example 18

A functional coated product (18) was obtained in the same manner as in Example 8, except that the thickness of the cured coating of the second coating layer was changed to 0.1 μm.

Comparative Example 7

A comparative coated product (7) was obtained in the same manner as in Comparative Example 1, except that the thickness of the second coating layer was changed to 0.1 μm.

Concerning the functional coated products (17), (18) and comparative coated product (7), the evaluation on coating properties and deterioration of the substrate and the coating were conducted according to the above-mentioned method.

The results thereof were shown in Table 5. As shown in this table, the cured coating of the functional coating material containing the photocatalyst of the functional coated products (17) and (18) had a contact angle of a few degrees, after the irradiation of ultraviolet light to show high wettability, in spite of a small layer thickness. On the other hand, the coating of Comparative coated product (7), in which a silicone coating material containing no photocatalyst was used, did not show this performance.

Example 19

A functional coated product (19) was obtained in the same manner as in Example 3, except that the acryl-modified silicone resin coating material (2), which was obtained in Preparation Example 4, was used instead of the acryl-modified silicone coating resin material (1).

Example 20

A functional coated product (20) was obtained in the same manner as in Example 3, except that the acryl-modified silicone resin coating material (3), which was obtained in Preparation Example 5, was used instead of the acryl-modified silicone coating resin material (1).

Concerning the functional coated products (19) and (20), the evaluation on coating properties and deterioration of the substrate and the coating were conducted according to the above-mentioned method.

The results thereof were shown in Table 6. As shown in this table, there was no problem concerning adhesion properties between the substrate and the first coating layer end those between the first coating layer and the second coating layer. There was no problem concerning other performance, either.

Example 21

A functional coated product (21) was obtained in the same manner as in Example 3, except that a PVC plate having the same size as that of the PC plate was used as a substrate.

Example 22

A functional coated product (22) was obtained in the same manner as in Example 8, except that a PVC plate having the same size as that of the PC plate was used as a substrate.

Comparative Example 8

A comparative coated product (8) was obtained in the same manner as in Example 3, except that a PVC plate having the same size as that of the PC plate was used as a substrate and that the functional coating material (1-3) was directly applied to the surface of this PVC plate without using the acryl-modified silicone resin coating material.

Example 23

A functional coated product (23) was obtained in the same manner as in Example 3, except that a plate coated with an organic substance having the same size as that of the PC plate (in which an acrylic coating PERMALOCK (manufactured by Rock Paint Co.) was applied in a thickness of 10 $\mu$m to an inorganic substrate made of a stainless steel plate) was used as a substrate.

Example 24

A functional coated product (24) was obtained in the same manner as in Example 8, except that a plate coated with an organic substance having the same size as that of the PC plate (in which an acryl coating PERMALOCK (manufactured by Rock Paint Co.) was applied in a thickness of 10 $\mu$m to an inorganic substrate made of a stainless steel plate) was used as a substrate.

Comparative Example 9

A comparative coated product (9) was obtained in the same manner as in Example 3, except that a plate coated with an organic substance having the same size as that of the PC plate (in which an acrylic coating PERMALOCK (manufactured by Rock Paint Co.) was applied in a thickness of 10 $\mu$m to an inorganic substrate made of a stainless steel plate) was used as a substrate and that the functional coating material (1-3) was directly applied to the surface of this plate coated with the organic substance and curing was conducted.

Concerning the functional coated products (21) to (24) and comparative coated products (8) and (9), the evaluation on coating properties and deterioration of the substrate and the coating were conducted according to the above-mentioned method.

The results thereof were shown in Table 7. As shown in this table, the functional coated products (21) to (24) in Examples, in which the first coating layer was formed with the cured coating of the acryl-modified coating material, showed no problem in adhesion properties, and the deterioration of the substrate and the coating was not observed. Also, other performance was good. On the other hand, the coparative coated products (8) and (9) in Comparative Examples showed poor adhesion properties, further, the deterioration of the substrate due to the photocatalyst was observed.

Example 25

A functional coated product (25) was obtained in the same manner as in Example 3, except that a stainless steel plate having the same size as that of the PC plate was used as a substrate.

Example 26

A functional coated product (26) was obtained in the same manner as in Example 8, except that a stainless steel plate having the same size as that of the PC plate was used as a substrate.

Comparative Example 10

A comparative coated product (10) was obtained in the same manner as in Example 3, except that a stainless steel plate having the same size as that of the PC plate was used as a substrate and that the functional coating material (1-3) was directly applied to the surface of this stainless steel plate without applying the acryl-modified silicone resin coating material and the curing was conducted.

Concerning the functional coated products (25) and (26) and Comparative coated product (10), the evaluation on coating properties and deterioration of the substrate and the coating were conducted according to the above-mentioned method.

The results thereof were shown in Table 8. As shown in this table, there was no problem concerning the deterioration of the substrate because an inorganic substrate was used in every coated product. However, the comparative coated product (10) was poor in adhesion properties, because the first coating layer made of a cured coating of the acryl-modified silicone resin coating material was not formed.

Example 27

A functional coated product (27) was obtained in the same manner as in Example 3, except that a glass plate having the same size as that of the PC plate was used as a substrate.

Example 28

A functional coated product (28) was obtained in the same manner as in Example 8, except that a glass plate having the same size as that of the PC plate was used as a substrate.

Example 29

A functional coated product (29) was obtained in the same manner as in Example 3, except that a tile having the same size as that of the PC plate was used as a substrate.

Example 30

A functional coated product (30) was obtained in the same manner as in Example 8, except that a tile having the same size as that of the PC plate was used as a substrate.

Example 31

A functional coated product (31) was obtained in the same manner as in Example 3, except that an enamel plate having the same size as that of the PC plate was used as a substrate.

Example 32

A functional coated product (32) was obtained in the same manner as in Example 8, except that an enamel plate having the same size as that of the PC plate was used as a substrate.

Concerning the functional coated products (27) to (32), the evaluation on coating properties and deterioration of the substrate and the coating were conducted according to the above-mentioned method.

The results thereof were shown in Tables 8 and 9. As shown in these tables, there was no problem concerning the deterioration of the substrate because an inorganic substrate was used in every coated product. Also, there was no problem concerning other performance.

Comparative Example 11

A comparative coated product (11) was obtained in the same manner as in Example 3, except that the acryl-modified silicone resin coating material (1), which was applied to the surface of the PC plate, was baked at 150° C. for 30 minutes to conduct complete curing (the ratio of the cured acryl-modified silicone resin coating material was 100% by weight, which was obtained in the same manner as in Example 3), and then the functional coating material (1-3) was applied to the surface thereof.

However, the coating of the functional coating material (1-3) could not be formed because the functional coating material (1-3) on the completely cured layer was repelled.

Comparative Example 12

A comparative coated product (12) was obtained in the same manner as in Example 3, except that the acryl-modified silicone resin coating material (1), which was applied to the surface of the PC plate, was left to stand for 10 minutes at room temperature and then the functional coating material (1-3) was applied to the surface thereof, while the applied acryl-modified silicone resin coating material (1) was in a wet condition.

Concerning the comparative functional coated product (12), the evaluation on coating properties and deterioration of the substrate and the coating were conducted according to the above-mentioned method.

The results thereof were shown in Table 10. As shown in this table, sufficient adhesion properties were not obtained between the substrate and the first coating layer.

Examples 33 to 37

Functional coated products (33) to (37) were obtained in the same manner as in Example 3, except that a tile having the same size as that of the PC plate was used as a substrate and that the first coating layer was formed with acryl-modified silicone resin coating materials (4) to (8) instead of the acryl-modified silicone resin coating material (1).

Example 38

A functional coated product (38) was obtained in the same manner as in Example 8, except that a tile having the same size as that of the PC plate was used as a substrate and that the first coating layer was formed with an acryl-modified silicone resin coating material (9) instead of the acryl-modified silicone resin coating material (1).

Comparative Example 13

A comparative coated product (13) was obtained in the same manner as in Example 8, except that a tile having the same size as that of the PC plate was used as a substrate, that the first coating layer was formed with a commercially available epoxy-type primer (EPORO Z PRIMER, manufactured by ISAMU PAINT CO.) instead of the acryl-modified silicone resin coating material (1), and that the thickness of the cured coating of the first coating layer was changed to 8 $\mu$m.

Comparative Example 14

A comparative coated product (14) was obtained in the same manner as in Example 8, except that a tile having the same size as that of the PC plate was used as a substrate, that the first coating layer was formed with an acryl-modified silicone resin coating material (7) instead of the acryl-modified silicone resin coating material (1), and that the second coating layer was formed with the comparative coating material (1) instead of the functional coating material (2-3).

In order to study the durability of the coating and the influence on the first coating layer due to the photocatalytic ability, the following accelerated weathering evaluation was conducted with the above-mentioned Sunshine Weatherometer, as for the functional coated products (29), (30), (33) to (38) and comparative coated products (13) and (14). Further, the reason why the tile was used as a substrate of the coated product was because the tile has less weathering deterioration. Therefore, it is possible to examine the durability of the coating itself clearly.

The test time was 4,000 hours, and the adhesion properties and degree of discoloration of the coating was examined. Further, the adhesion properties and degree of discoloration of the coating was also examined halfway, 2,500 hours after the test.

The adhesion properties were examined according to the above-mentioned method.

The degree of discoloration was conducted according to the color difference ($\Delta E$) prescribed in JIS-Z8730. In general, it is said that a person's eye can confirm the discoloration when $\Delta E$ is 3 or more. Further, it is said that the irradiation for 4,000 hours by the Sunshine Weatherometer corresponds to exposure outdoors for 10 years.

Evaluation results are shown in Tables 11 and 12.

As shown in Tables 11 and 12, concerning the functional coated products (29), (30) and (33) to (38), the discoloration was more serious, particularly after 4,000 hours, when the ratio of Component (D) was increased. However, it does not seem to cause any problems on the practical use, except for the case where high durability is required. Particularly, in the functional coated product (36) in Example 36, poor adhesion occurred in some parts between the first coating layer and the second coating layer 4,000 hours later. However, the deterioration was not observed 2,500 hours later.

Further, the comparative coated product (13), in which the commercially available epoxy-type primer was used, showed remarkable deterioration in the coating performance. Concerning the coated product in Comparative Example 14, the degree of discoloration of the coating was reduced though the first coating layer was formed from the same material as that of the functional coated product (36) in Example 36, because the photocatalyst was not contained in the second coating layer.

Example 39

EPORO E PRIMER (manufactured by ISAMU PAINT, CO.) was applied to about 5 $m^2$ of a concrete side wall (no coated) of a path in the premise of the head office of Matsushita Electric Works, Ltd. (Kadoma, Osaka) as a prime coat, in order to prevent the elution of an alkaline component in the concrete, under predetermined conditions. After drying for 24 hours, colored coating was conducted with the pigment-containing acryl-modified silicone resin coating material prepared in Example 11, so that the thickness of the cured coating was about 30 $\mu$m. After it was left to stand for 5 hours at room temperature, it was confirmed that the cured coating was a semi-cured condition. Then, the functional coating material (2-3) prepared in Preparation Example 2-3 was applied thereto so that the thickness of the cured coating was about 0.5 $\mu$m. All the coating was conducted using a hand roller.

After exposure for about 3 months, there was no dirt on the coated side wall and it maintained the condition in the beginning of the coating.

Example 40

An acryl-modified coating material (1) prepared in Preparation Example 3 was applied to a road traffic sign ((width) 600 mm×(length) 350 mm, an one-way sign) and a pole in the premise of the head office of Matsushita Electric Works, Ltd. (Kadoma, Osaka), after wiping off the dirt with ethanol, so that the thickness of the cured coating was about 5 $\mu$m. After it was left to stand for 5 hours at room temperature, it was confirmed that the cured coating was a semi-cured condition. Then, the functional coating material (1-3) prepared in Preparation Example 1-3 was applied thereto so that the thickness of the cured coating was about 0.5 $\mu$m. All the coating was conducted by means of brushing.

After exposure for about 3 months, there was no dirt on the coated side wall and it maintained the condition in the beginning of the coating.

Example 41

The first coating layer and the second coating layer were formed on a reflective tape for a road traffic sign (manufactured by Sumitomo 3M Co.) and on a post cone for a road (manufactured by Nippon Mectron Co.) in the same manner as in Example 3. The reflective tape was pasted on the post cone, followed by exposure for about 3 months at the side of the road in the premise of the head office of Matsushita Electric Works, Ltd. (Kadoma, Osaka). There was no dirt on the post cone and it maintained the condition in the beginning of the coating.

Example 42

The acryl-modified silicone resin coating material (1) prepared in Example 3 was applied to an outer wall (about 10 $m^2$) of the main building in the premise of the head office of Matsushita Electric Works, Ltd. (Kadoma, Osaka), so that the thickness of the cured coating was about 8 $\mu$m. After it was left to stand for 4 hours at room temperature, it was confirmed that the cured coating was a semi-cured condition. Then, the functional coating material (1-3) prepared in Preparation Example 1-3 was applied thereto so that the thickness of the cured coating was about 0.5 $\mu$m. All the coating was conducted using a hand roller. After exposure for about 3 months, there was no dirt on the coated building and it maintained the condition in the beginning of the coating.

Example 43

The acryl-modified coating material (1) prepared in Preparation Example 3 was applied to a glass having a size of 1 $m^2$ (a thickness of 6 mm) of the research laboratory (east side, the second floor) in the premise of the head office of Matsushita Electric Works, Ltd., after wiping off the dirt with ethanol, so that the thickness of the cured coating was about 1 $\mu$m. After it was left to stand for 2 hours at room temperature, it was confirmed that the cured coating was a semi-cured condition. Then, the functional coating material (2-3) prepared in Preparation Example 2-3 was applied thereto so that the thickness of the cured coating was about 0.5 $\mu$m. All the coating was conducted by means of flow coating.

After exposure for about 3 months, there was no dirt on the coated building and it maintained the condition in the beginning of the coating.

Example 44

The acryl-modified coating material (1) prepared in Preparation Example 3 was applied to the whole apparatus of the road light (YA32020 for sidewalk, manufactured by Matsushita Electric Works, Ltd.) including front glass, a pole, an outer surface of a reflective plate, etc., in the premise of the head office of Matsushita Electric Works, Ltd., after wiping off the dirt with ethanol, so that the thickness of the cured coating was about 1 $\mu$m. After it was left to stand for 2 hours at room temperature, it was confirmed that the cured coating was a semi-cured condition. Then, the functional coating material (1-3) prepared in Preparation Example 1-3 was applied thereto so that the thickness of the cured coating was about 0.5 $\mu$m. All the coating was conducted with a sponge roller.

After exposure for about 3 months, there was no dirt on the coated front glass, the pole, the reflective plate, etc. and it maintained the condition in the beginning of the coating.

Example 45

The acryl-modified coating material (1) prepared in Preparation Example 3 was applied to an auto body (TOFOTA SPRINTER, the 1990 model), after wiping off the dirt with ethanol, so that the thickness of the cured coating was about 1 $\mu$m. After it was left to stand for 2 hours at room temperature, it was confirmed that the cured coating was a semi-cured condition. Then, the functional coating material (1-3) prepared in Preparation Example 1-3 was applied thereto so that the thickness of the cured coating was about 0.5 $\mu$m. All the coating was conducted with a sponge roller.

After exposure for about 3 months, there was no dirt on the coated auto body and it maintained the condition in the beginning of the coating.

Example 46

EPORO E PRIMER (manufactured by ISAMU PAINT, CO.) was applied to a cement-type facing material (manufactured by Matsushita Electric Works, Ltd., a multi-sizing brick tile pattern) as a prime coat, in order to prevent the elution of an alkaline component, under predetermined conditions. After drying for 24 hours, colored coating was conducted with the pigment-containing acryl-modified silicone resin coating material prepared in Example 11, so that the thickness of the cured coating was about 30 μm. After it was left to stand for 5 hours at room temperature, it was confirmed that the cured coating was a semi-cured condition. Then, the functional coating material (2-3) prepared in Preparation Example 2-3 was applied thereto so that the thickness of the cured coating was about 0.5 μm. All the coating was conducted by means of airless spray.

After exposure for about 3 months, there was no dirt on the facing material and it maintained the condition in the beginning of the coating.

Example 47

Half of the area of a reflective plate (a steel plate coated with white melamine) for a Fuji-type fluorescent lighting apparatus (20W), (FA22063 manufactured by Matsushita Electric Works, Ltd.), was applied in the same manner as in Example 3, except that the second coating layer was dried at 90° C. for 15 minutes. All the coating was conducted by means of airless spray. The fluorescent lighting apparatus, including the reflective plate coated in that way, was equipped in the cookery of the internal cafeteria in the premise of the head office of Matsushita Electric Works, Ltd. (Kadoma, Osaka), and it was observed. About three months later, the coated portion had less dirt compared with the other portion.

Example 48

EPORO E PRIMER (manufactured by ISAMU PAINT, CO.) was applied to about 1 $m^2$ of a concrete electric-light pole (no coated) in the premise of the head office of Matsushita Electric Works, Ltd. (Kadoma, Osaka) as a prime coat, in order to prevent the elution of an alkaline component in the concrete, under predetermined conditions. After drying for 24 hours, colored coating was conducted with the pigment-containing acryl-modified silicone resin coating material prepared in Example 11, so that the thickness of the cured coating was about 30 μm. After it was left to stand for 5 hours at room temperature, it was confirmed that the cured coating was a semi-cured condition. Then, the functional coating material (1-3) prepared in Preparation Example (1-3) was applied thereto, so that the thickness of the cured coating was about 0.5 μm. All the coating was conducted using a hand roller.

After exposure for about 3 months, there was no dirt on the coated electric-light pole and it maintained the condition in the beginning of the coating.

Example 49

The acryl-modified silicone resin coating material (1) prepared in preparation Example 3 was applied to a protection fence (a galvanized steel plate) in the premise of the head office of Matsushita Electric Works, Ltd. (Kadoma, Osaka), after wiping off the dirt with ethanol, so that the thickness of the cured coating was about 1 μm. After it was left to stand for one hour at room temperature, it was confirmed that the cured coating was a semi-cured condition. Then, the functional coating material (1-3) prepared in Preparation Example (1-3) was applied thereto, so that the thickness of the cured coating was about 0.5 μm. All the coating was conducted using a hand roller.

After exposure for about 3 months, there was no dirt on the coated protection fence and it maintained the condition in the beginning of the coating.

TABLE 1

| | Ex. 1 | Ex. 2 | Ex. 3 | Ex. 4 | Ex. 5 | Comp. Ex. 1 |
|---|---|---|---|---|---|---|
| Coated product | Func.*1(1) | Func. (2) | Func. (3) | Func. (4) | Func. (5) | Comp.*2 (1) |
| Substrate | PC plate | PC plate | PC plate | PC plate | PC plate | PC plate |
| First coating layer | | | | | | |
| Coating material | Acryl-Modified Silicone Resin (1) | Acryl-modified silicone resin (1) | Acryl-modified silicone resin (1) | Acryl-modified silicone resin (1) | Acryl-Modified silicone resin (1) | Acryl-modified silicone resin (1) |
| Coating thickness (μm) | 1 | 1 | 1 | 1 | 1 | 1 |
| Second coating layer | | | | | | |
| Coating material | Func. (1–1) | Func. (1–2) | Func. (1–3) | Func. (1–4) | Func. (1–5) | Comp. (1) |
| Resin solid content/photocatalyst (weight ratio) | 80/20 | 60/40 | 50/50 | 40/60 | 20/80 | 100/0 |
| Coating Thickness (μm) | 0.5 | 0.5 | 0.5 | 0.5 | 0.5 | 0.5 |
| Photocatalytic action | 10 | 40 | 47 | 56 | 79 | 0 |
| Adhesion properties | | | | | | |
| Between substrate and first coating layer | 100/100 | 100/100 | 100/100 | 100/100 | 100/100 | 100/100 |

TABLE 1-continued

| | Ex. 1 | Ex. 2 | Ex. 3 | Ex. 4 | Ex. 5 | Comp. Ex. 1 |
|---|---|---|---|---|---|---|
| Between first coating layer and second coating layer | 100/100 | 100/100 | 100/100 | 100/100 | 100/100 | 100/100 |
| Hardness | 5 H | 4 H | 4 H | 3 H | 2 H | 6 H |
| Contact angle | | | | | | |
| Initial stage | 75° | 73° | 72° | 60° | 50° | 75° |
| After UV irradiation | <10° | <10° | <10° | <10° | <10° | 75° |
| Deterioration of coating | None | None | None | None | None | None |
| Deterioration of substrate | None | None | None | None | None | None |

*[1]Func.:Functional (same below)
*[2]Comp.:Comparative (same below)

TABLE 2

| | Ex. 6 | Ex. 7 | Ex. 8 | Ex. 9 | Ex. 10 | Comp. Ex. 2 |
|---|---|---|---|---|---|---|
| Coated product | Func. (6) | Func. (7) | Func. (8) | Func. (9) | Func. (10) | Comp. (2) |
| Substrate | PC plate | PC plate | PC plate | PC plate | PC plate | PC plate |
| First coating layer | | | | | | |
| Coating material | Acryl-modified silicone resin (1) | Acryl-modified silicone resin (1) | Acryl-modified silicone resin (1) | Acryl-modified silicone resin (1) | Acryl-modified silicone resin (1) | Acryl-modified silicone resin (1) |
| Coating thickness (μm) | 1 | 1 | 1 | 1 | 1 | 1 |
| Second coating layer | | | | | | |
| Coating material | Func. (2–1) | Func. (2–2) | Func. (2–3) | Func. (2–4) | Func. (2–5) | Comp. (2) |
| Resin solid content/photocatalyst (weight ratio) | 80/20 | 60/40 | 50/50 | 40/60 | 20/80 | 100/0 |
| Coating thickness (μm) | 0.5 | 0.5 | 0.5 | 0.5 | 0.5 | 0.5 |
| Photocatalytic action | 8 | 36 | 44 | 55 | 72 | 0 |
| Adhesion properties | | | | | | |
| Between substrate and first coating layer | 100/100 | 100/100 | 100/100 | 100/100 | 100/100 | 100/100 |
| Between first coating layer and second coating layer | 100/100 | 100/100 | 100/100 | 100/100 | 100/100 | 100/100 |
| Hardness | 4 H | 4 H | 4 H | 3 H | 2 H | 5 H |
| Contact angle | | | | | | |
| Initial stage | 80° | 78° | 78° | 74° | 65° | 80° |
| After UV irradiation | <10° | <10° | <10° | <10° | <10° | 80° |
| Deterioration of coating | None | None | None | None | None | None |
| Deterioration of substrate | None | None | None | None | None | None |

TABLE 3

| | Comp. Ex. 3 | Comp. Ex. 4 | Comp. Ex. 5 | Comp. Ex. 6 |
|---|---|---|---|---|
| Coated product | Comp. (3) | Comp. (4) | Comp. (5) | Comp. (6) |
| Substrate | PC plate | PC plate | PC plate | PC plate |
| First coating layer | | | | |
| Coating material | Acryl-modified silicone resin (1) | Comp. (3) | — | — |
| Coating thickness ($\mu$m) | 1 | 1 | — | — |
| Second coating layer | | | | |
| Coating material | Titanium oxide | Func. (1–3) | Func. (1–3) | Comp. (1) |
| Resin solid content/ photocatalyst (weight ratio) | — | 50/50 | 50/50 | 100/0 |
| Coating thickness ($\mu$m) | 0.5 | 0.5 | 0.5 | 0.5 |
| Photocatalytic action | 100 | 48 | 48 | 0 |
| Adhesion properties | | | | |
| Between substrate and first coating layer | 100/100 | 50/100 | — | — |
| Between first coating layer and second coating layer | 20/100 | 98/100 | — | — |
| Between substrate and second coating layer | — | — | 30/100 | 40/100 |
| Hardness | <2 B | 4 H | 4 H | 6 H |
| Contact angle | | | | |
| Initial stage | 49° | 71° | 72° | 76° |
| After UV irradiation | <10° | <10° | <10° | 75° |
| Deterioration of coating | None | None | None | None |
| Deterioration of substrate | Some (Discoloration) | None | None | None |

TABLE 4

| | Ex. 11 | Ex. 12 | Ex. 13 | Ex. 14 | Ex. 15 | Ex. 16 |
|---|---|---|---|---|---|---|
| Coated product | Func. (11) | Func. (12) | Func. (13) | Func. (14) | Func. (15) | Func. (16) |
| Substrate | PC plate | PC plate | PC plate | PC plate | PC plate | PC plate |
| First coating layer | | | | | | |
| Coating material | Acryl-modified silicone resin (1) + Pigment 1 | Acryl-modified silicone resin (1) + Pigment 2 | Acryl-modified silicone resin (1) + Pigment 3 | Acryl-modified silicone resin (1) + Pigment 1 | Acryl-modified silicone resin (1) + Pigment 2 | Acryl modified silicone resin (1) + Pigment 3 |
| Coating thickness ($\mu$m) | 1 | 1 | 1 | 1 | 1 | 1 |
| Second coating layer | | | | | | |
| Coating material | Func. (1–3) | Func. (1–3) | Func. (1–3) | Func. (2–3) | Func. (2–3) | Func. (2–3) |
| Resin solid content/ photocatalyst (weight ratio) | 50/50 | 50/50 | 50/50 | 50/50 | 50/50 | 50/50 |
| Coating thickness ($\mu$m) | 0.5 | 0.5 | 0.5 | 0.5 | 0.5 | 0.5 |
| Photocatalytic action | 47 | 49 | 47 | 44 | 46 | 47 |
| Adhesion properties | | | | | | |
| Between substrate and first coating layer | 100/100 | 100/100 | 100/100 | 100/100 | 100/100 | 100/100 |
| Between first coating layer and second coating layer | 100/100 | 100/100 | 100/100 | 100/100 | 100/100 | 100/100 |

TABLE 4-continued

| | Ex. 11 | Ex. 12 | Ex. 13 | Ex. 14 | Ex. 15 | Ex. 16 |
|---|---|---|---|---|---|---|
| Hardness | 4 H | 4 H | 4 H | 4 H | 4 H | 4 H |
| Contact angle | | | | | | |
| Initial stage | 70° | 71° | 71° | 78° | 78° | 78° |
| After UV irradiation | <10° | <10° | <10° | <10° | <10° | <10° |
| Deterioration of coating | None | None | None | None | None | None |
| Deterioration of substrate | None | None | None | None | None | None |

TABLE 5

| | Ex. 17 | Ex. 18 | Comp. Ex. 7 |
|---|---|---|---|
| Coated product | Func. (17) | Func. (18) | Comp. (7) |
| Substrate | PC plate | PC plate | PC plate |
| First coating layer | | | |
| Coating material | Acryl-modified silicone resin (1) | Acryl-modified silicone resin (1) | Acryl-modified silicone resin (1) |
| Coating thickness (μm) | 1 | 1 | 1 |
| Second coating layer | | | |
| Coating material | Func. (1–3) | Func. (2–3) | Comp. (1) |
| Resin solid content/ photocatalyst (weight ratio) | 50/50 | 50/50 | 100/0 |
| Coating thickness (μm) | 0.1 | 0.1 | 0.1 |
| Photocatalytic action | 33 | 30 | 0 |
| Adhesion properties | | | |
| Between substrate and first coating layer | 100/100 | 100/100 | 100/100 |
| Between first coating layer and second coating layer | 100/100 | 100/100 | 100/100 |
| Hardness | 4 H | 4 H | 5 H |
| Contact angle | | | |
| Initial stage | 74° | 78° | 75° |
| After UV irradiation | <10° | <10° | 75° |
| Deterioration of coating | None | None | None |
| Deterioration of substrate | None | None | None |

TABLE 6

| | Ex. 19 | Ex. 20 |
|---|---|---|
| Coated product | Func. (19) | Func. (20) |
| Substrate | PC plate | PC plate |
| First coating layer | | |
| Coating | Acryl- | Acryl- |

TABLE 6-continued

| | Ex. 19 | Ex. 20 |
|---|---|---|
| material | modified silicone resin (2) | modified silicone resin (3) |
| Coating thickness (μm) | 1 | 1 |
| Second coating layer | | |
| Coating material | Func. (1–3) | Func. (2–3) |
| Resin solid content/ photocatalyst (weight ratio) | 50/50 | 50/50 |
| Coating thickness (μm) | 0.5 | 0.5 |
| Photocatalytic action | 48 | 46 |
| Adhesion properties | | |
| Between substrate and first coating layer | 100/100 | 100/100 |
| Between first coating layer and second coating layer | 100/100 | 100/100 |
| Hardness | 4 H | 4 H |
| Contact angle | | |
| Initial stage | 70° | 79° |
| After UV irradiation | <10° | <10° |
| Deterioration of coating | None | None |
| Deterioration of substrate | None | None |

TABLE 7

| | Ex. 21 | Ex. 22 | Comp. Ex. 8 | Ex. 23 | Ex. 24 | Comp. Ex. 9 |
|---|---|---|---|---|---|---|
| Coated product | Func. (21) | Func. (22) | Comp. (8) | Func. (23) | Func. (24) | Comp. (9) |
| Substrate | PVC plate | PVC plate | PVC plate | Organic-coated | Organic-coated | Organic-coated |
| First coating layer | | | | | | |
| Coating material | Acryl-modified silicone resin (1) | Acryl-modified silicone resin (1) | — | Acryl-modified silicone resin (1) | Acryl-modified silicone resin (1) | — |
| Coating thickness (μm) | 1 | 1 | — | 1 | 1 | — |
| Second coating layer | | | | | | |
| Coating material | Func. (1–3) | Func. (2–3) | Func. (1–3) | Func. (1–3) | Func. (2–3) | Func. (1–3) |
| Resin solid content/photocatalyst (weight ratio) | 50/50 | 50/50 | 50/50 | 50/50 | 50/50 | 50/50 |
| Coating thickness (μm) | 0.5 | 0.5 | 0.5 | 0.5 | 0.5 | 0.5 |
| Photocatalytic action | 49 | 47 | 48 | 48 | 46 | 48 |
| Adhesion properties | | | | | | |
| Between substrate and first coating layer | 100/100 | 100/100 | — | 100/100 | 100/100 | — |
| Between first coating layer and second coating layer | 100/100 | 100/100 | — | 100/100 | 100/100 | — |
| Between substrate and second coating layer | — | — | 25/100 | — | — | 30/100 |
| Hardness | 4 H | 4 H | 4 H | 4 H | 4 H | 3 H |
| Contact angle | | | | | | |
| Initial stage | 70° | 80° | 72° | 72° | 78° | 72° |
| After UV irradiation | <10°. | <10° | <10° | <10° | <10° | <10° |
| Deterioration of coating | None | None | None | None | None | None |
| Deterioration of substrate | None | None | Some | None | None | Some |

TABLE 8

| | Ex. 25 | Ex. 26 | Comp. Ex. 10 | Ex. 27 | Ex. 28 |
|---|---|---|---|---|---|
| Coated product | Func. (25) | Func. (26) | Comp. (10) | Func. (27) | Func. (28) |
| Substrate | Stainless plate | Stainless plate | Stainless plate | Glass plate | Glass plate |
| First coating layer | | | | | |
| Coating material | Acryl-modified silicone resin (1) | Acryl-modified silicone resin (1) | — | Acryl-modified silicone resin (1) | Acryl-modified silicone resin (1) |
| Coating thickness (μm) | 1 | 1 | — | 1 | 1 |
| Second coating layer | | | | | |
| Coating | Func. | Func. | Func. | Func. | Func. |

TABLE 8-continued

| | Ex. 25 | Ex. 26 | Comp. Ex. 10 | Ex. 27 | Ex. 28 |
|---|---|---|---|---|---|
| material | (1–3) | (2–3) | (1–3) | (1–3) | (2–3) |
| Resin solid content/ photocatalyst (weight ratio) | 50/50 | 50/50 | 50/50 | 50/50 | 50/50 |
| Coating thickness (μm) | 0.5 | 0.5 | 0.5 | 0.5 | 0.5 |
| Photocatalytic action | 47 | 47 | 45 | 47 | 46 |
| Adhesion properties | | | | | |
| Between substrate and first coating layer | 100/100 | 100/100 | — | 100/100 | 100/100 |
| Between first coating layer and second coating layer | 100/100 | 100/100 | — | 100/100 | 100/100 |
| Between substrate and second coating layer | — | — | 30/100 | — | — |
| Hardness | 4 H | 4 H | 4 H | 4 H | 4 H |
| Contact angle | | | | | |
| Initial stage | 69° | 78° | 70° | 78° | 79° |
| After UV irradiation | <10° | <10° | <10° | <10° | <10° |
| Deterioration of coating | None | None | None | None | None |
| Deterioration of substrate | None | None | None | None | None |

TABLE 9

| | Ex. 29 | Ex. 30 | Ex. 31 | Ex. 32 |
|---|---|---|---|---|
| Coated product | Func. (29) | Func. (30) | Func. (31) | Func. (32) |
| Substrate | Tile | Tile | Enamel plate | Enamel plate |
| First coating layer | | | | |
| Coating material | Acryl-modified silicone resin (1) | Acryl-modified silicone resin (1) | Acryl-modified silicone resin (1) | Acryl-modified silicone resin (1) |
| Coating thickness (μm) | 1 | 1 | 1 | 1 |
| Second coating layer | | | | |
| Coating material | Func. (1–3) | Func. (2–3) | Func. (1–3) | Func. (2–3) |
| Resin solid content/ photocatalyst (weight ratio) | 50/50 | 50/50 | 50/50 | 50/50 |
| Coating thickness (μm) | 0.5 | 0.5 | 0.5 | 0.5 |
| photocatalytic action | 46 | 46 | 46 | 48 |
| Adhesion properties | | | | |
| Between substrate and first coating layer | 100/100 | 100/100 | 100/100 | 100/100 |

TABLE 9-continued

| | Ex. 29 | Ex. 30 | Ex. 31 | Ex. 32 |
|---|---|---|---|---|
| Between first coating layer and second coating layer | 100/100 | 100/100 | 100/100 | 100/100 |
| Between substrate and second coating layer | — | — | — | — |
| Hardness | 4 H | 4 H | 4 H | 4 H |
| Contact angle | | | | |
| Initial stage | 70° | 80° | 79° | 79° |
| After UV irradiation | <10° | <10° | <10° | <10° |
| Deterioration of coating | None | None | None | None |
| Deterioration of substrate | None | None | None | None |

TABLE 10

| | Comp. Ex. 11 | Comp. Ex. 12 |
|---|---|---|
| Coated product | Comp. (11) | Comp. (12) |
| Substrate | PC plate | PC plate |
| First coating layer | | |
| Coating material | Acryl-modified silicone resin (1) *1 | Acryl-modified silicone resin (1) *2 |
| Coating | 1 | 1 |

TABLE 10-continued

| | Comp. Ex. 11 | Comp. Ex. 12 |
|---|---|---|
| thickness (μm) | | |
| Second coating layer | | |
| Coating material | Func. (1–3) | Func. (1–3) |
| Resin solid content/ photocatalyst (weight ratio) | 50/50 | 50/50 |
| Coating thickness (μm) | | 0.5 |
| Photocatalytic action | Impossible to form second | 44 |

TABLE 10-continued

| | Comp. Ex. 11 | Comp. Ex. 12 |
|---|---|---|
| Adhesion properties | coating layer | |
| Between substrate and first coating layer | | 80/100 |
| Between first coating layer and second coating layer | | 100/100 |
| Hardness | | 3 H |
| Contact angle | | |
| Initial stage | | 72° |
| After UV irradiation | | <10° |
| Deterioration of coating | Impossible to form second | None |
| Deterioration of substrate | coating layer | None |

*1: After application, baked at 150° C. for 30 minutes.
*2: After application, left to stand at room temperature for 10 minutes.

TABLE 11

| | Ex. 29 | Ex. 30 | Ex. 33 | Ex. 34 | Ex. 35 | Ex. 36 |
|---|---|---|---|---|---|---|
| Coated product | Func. (29) | Func. (30) | Func. (33) | Func. (34) | Func. (35) | Func. (36) |
| substrate | Tile | Tile | Tile | Tile | Tile | Tile |
| First coating layer | | | | | | |
| Coating material | Acryl-modified silicone resin (1) | Acryl-modified silicone resin (1) | Acryl-modified silicone resin (4) | Acryl-modified silicone resin (5) | Acryl-modified silicone resin (6) | Acryl-modified silicone resin |
| Coating thickness (μm) | 1 | 1 | 1 | 1 | 1 | 1 |
| Second coating layer | | | | | | |
| Coating material | Func. (1–1) | Func. (2–3) | Func. (1–3) | Func. (1–3) | Func. (1–3) | Func. (1–3) |
| Resin solid content/ photocatalyst (weight ratio) | 50/50 | 50/50 | 50/50 | 50/50 | 50/50 | 50/50 |
| Coating thickness (μm) | 0.5 | 0.5 | 0.5 | 0.5 | 0.5 | 0.5 |
| Photocatalytic action | 46 | 46 | 46 | 46 | 46 | 46 |
| Evaluation of accelerated weathering test | | | | | | |
| Adhesion properties | | | | | | |
| Between substrate and first coating layer | | | | | | |
| 2,500 hrs. | 100/100 | 100/100 | 100/100 | 100/100 | 100/100 | 100/100 |
| 4,000 hrs. | 100/100 | 100/100 | 100/100 | 100/100 | 100/100 | 100/100 |

TABLE 11-continued

| | Ex. 29 | Ex. 30 | Ex. 33 | Ex. 34 | Ex. 35 | Ex. 36 |
|---|---|---|---|---|---|---|
| Between first coating layer and second coating layer | | | | | | |
| 2,500 hrs. | 100/100 | 100/100 | 100/100 | 100/100 | 100/100 | 100/100 |
| 4,000 hrs. | 100/100 | 100/100 | 100/100 | 100/100 | 100/100 | 90/100 |
| Discoloration degree Δ | | | | | | |
| 2,500 hrs. | 0.2 | 0.3 | 1.8 | 0.6 | 3.0 | 3.5 |
| 4,000 hrs. | 0.5 | 0.6 | 5.5 | 1.0 | 8.0 | 10.5 |

TABLE 12

| | Ex. 37 | Ex. 38 | Comp. Ex. 13 | Comp. Ex. 14 |
|---|---|---|---|---|
| Coated product | Func. (37) | Func. (38) | Comp. (13) | Comp. (14) |
| Substrate | Tile | Tile | Tile | Tile |
| First coating layer | | | | |
| Coating material | Acryl-modified silicone resin (8) | Acryl-modified silicone resin (9) | Commercially available epoxy type primer | Acryl-modified silicone resin (7) |
| Coating thickness (μm) | 1 | 1 | 8 | 1 |
| Second coating layer | | | | |
| Coating material | Func. (1–1) | Func. (2–3) | Func. (2–3) | Comp. (1) |
| Resin solid content/photocatalyst (weight ratio) | 50/50 | 50/50 | 50/50 | 100/0 |
| Coating thickness (μm) | 0.5 | 0.5 | 0.5 | 0.5 |
| Photocatalytic action | 46 | 46 | 46 | 0 |
| Evaluation of accelerated weathering test | | | | |
| Adhesion properties | | | | |
| Between substrate and first coating layer | | | | |
| 2,500 hrs. | 100/100 | 100/100 | 100/100 | 100/100 |
| 4,000 hrs. | 100/100 | 100/100 | 50/100 | 100/100 |
| Between first coating layer and second coating layer | | | | |
| 2,500 hrs. | 100/100 | 100/100 | 90/100 | 100/100 |
| 4,000 hrs. | 100/100 | 100/100 | 20/100 | 100/100 |
| Discoloration degree Δ | | | | |
| 2,500 hrs. | 2.1 | 2.6 | 5.4 | 2.3 |
| 4,000 hrs. | 6.0 | 7.0 | 30.0 | 5.7 |

EFFECT OF THE INVENTION

The functional coated product of the present invention is excellent in adhesion properties of the coating to various substrates for prime coat, and the deterioration of the substrate and the coating due to photocatalytic action hardly occurs. Further, the smoothness on the surface of the coating is high and therefore, it hardly has dirt and also has high photocatalytic action.

In the functional coated product of the present invention, the cured coating made of the acryl-modified silicone resin coating material is interposed, as the first coating layer, between the substrate and the cured coating made of the functional coating material containing a photocatalyst, the substrate is not directly influenced by the photocatalytic action, even if the substrate is an organic substrate or a substrate coated with an organic substance. Therefore, the deterioration of the substrate due to the photocatalytic action hardly occurs. Further, by the interposition of the first coating layer comprising the cured coating of the above-mentioned acryl-modified silicone resin coating material, the adhesion properties of the above-mentioned functional coating material to the substrate is improved.

The functional coating material and an acryl-modified silicone resin coating material to be used in the present invention are both inorganic coating materials, therefore, the coating thereof is hardly deteriorated even if it receives the photocatalytic action.

When the functional coated product of the present invention is irradiated by ultraviolet light, dirt such as water-repellant organic substances is decomposed by the action of the photocatalyst contained in the second coating layer, so that wettability of the coating to water is improved, in addition to the effect of decomposition and deodorization of organic substances, the antifungal effect, the antimycotic effect, etc. This performance is exhibited regardless of the thickness of the coating and the amount of the photocatalyst contained therein. If the wettability of the coating to water is high, a defrosting effect, an stainproof effect due to washing action by rain-water in the outdoor use, etc. are exhibited. Accordingly, the functional coated product of the present invention also has other performance such as the prevention of moisture condensation on the window glass, etc. in winter, or the stainproof effect of architectural structure, road structure, automobiles, vehicles, etc.

The functional coated product of the present invention shows desirable performance, even if a pigment is dispersed into the acryl-modified silicone resin coating material which forms the first coating layer. Therefore, it is possible to color the coating with an optional color.

In the functional coating material of the present invention, it is possible to control coating properties such as photocatalytic performance, hardness or surface conditions of the coating, depending on the use, by changing the ratio of the amount of the resin to that of the photocatalyst.

The coating material to be used for the functional coated product of the present invention can be used under dry-curing conditions or the temperature in the wide range, because it is possible to conduct not only heat-curing but also cold curing. Therefore, it is possible to apply a coating not only to a substrate having a configuration which is not easily uniformly heated, a substrate having a large size or a substrate having poor heat resistance, etc., but also to a place where heating is not easily conducted, for example, when coating operations are conducted outdoors. Accordingly, its industrial value is high.

According to the production method of the present invention, the application for forming the second coating layer is conducted while the first coating layer is in a semi-cured condition. Therefore, it is possible to conduct the coating process for a short period of time, by selecting temperature conditions, etc. Thus, according to the production method of the present invention, a functional coated product having the above-mentioned excellent performance can be obtained easily and effectively.

What is claimed is:

1. A functional coated product having a first coating layer formed of a cured coating of an acryl-modified silicone resin coating material comprising the following components (A), (B), (C) and (D) on a surface of a substrate, and a second coating layer formed of a cured coating of a functional coating material comprising the following components (E) and (F), over the first coating layer;

Component (A):

a silica-dispersed organosilane oligomer solution obtained by partially hydrolyzing a hydrolyzable organosilane represented by the general formula $$R^{1}{}_{m}SiX_{4-m} \quad (I)$$

wherein $R^1$ indicates a monovalent hydrocarbon group having 1 to 8 carbon atoms, which may be the same or different, m indicates an integer of 0 to 3, and X indicates a hydrolyzable group in colloidal silica dispersed in an organic solvent, water or a mixed solvent of them, under the condition that 0.001 to 0.5 mol of water is used based on 1 mol equivalent of the above-mentioned hydrolyzable group (X);

Component (B):

a polyorganosiloxane represented by the average compositional formula $$R^{2}{}_{a}Si(OH)_{b}O_{(4-a-b)/2} \quad (II)$$

wherein $R^2$ indicates a monovalent hydrocarbon group having 1 to 8 carbon atoms, which may be the same or different, a and b separately satisfy the following condition:

$$0.2 \leqq a \leqq 2,\ 0.0001 \leqq b \leqq 3,\ a+b<4,$$

which contains a silanol group in the molecule structure and has an average molecular weight (in terms of polystyrene) of 700 to 20,000;

Component (C):

a curing catalyst;

Component (D):

an acrylic resin of copolymer of first (meth)acrylate represented by the general formula (III)

$$CH_2{=}CR^3(COOR^4) \quad (III)$$

in which $R^3$ is a hydrogen atom or a methyl group, and $R^4$ is a hydrocarbon group having 1 to 9 carbon atoms, the second (meth)acrylate of the general formula (III) in which $R^3$ is a hydrogen atom or a methyl group, and $R^4$ is at least one group selected from the group consisting of an epoxy group, a glycidyl group, and a hydrocarbon group containing at least either of the above, and the third (meth)acrylate of the general formula (III) in which $R^3$ is a hydrogen atom or a methyl group, and $R^4$ is a hydrocarbon group containing an alkoxy silyl group or a halogenated silyl group, and said acrylic resin having an average molecular weight (in terms of polystyrene) of 1,000 to 50,000;

Component (E):

an organosiloxane comprising a hydrolyzed polycondensate of;

5 to 30,000 parts by weight of a silica compound represented by the general formula:

$$Si(OR^5)_4$$

and/or colloidal silica, 100 parts by weight of a silica compound represented by the general formula:

$$R^6Si(OR^5)_3$$

and 0 to 60 parts by weight of a silica compound represented by the general formula:

$$R^6Si(OR^5)_2$$

wherein $R^5$ and $R^6$ indicate a monovalent hydrocarbon group and said weight-average molecular weight being adjusted to 800 or more in terms of polystyrene; and Component (F):

a photocatalyst.

2. The functional coated product according to claim 1, wherein, in the above-mentioned acryl-modified silicone resin coating material, 1 to 94 parts by weight of Component (B) and 5 to 35 parts by weight of Component (D) are formulated in 1 to 94 parts by weight of Component (A), based on the solid content of the whole condensate (provided that the total amount of Components (A), (B) and (D) comes to 100 parts by weight).

3. The functional coated product according to claim 1, which further contains a pigment.

4. The functional coated product according to claim 1, wherein a substrate is selected from the group consisting of a metallic substrate, an organic substrate and an organic coating substrate in which either one of the above substrates has a coating formed from an organic compound on the surface thereof.

5. A member related to building construction at least a part of which is equipped with the functional coated product according to claim 1.

6. A gate for a building at least a part of which is equipped with the functional coated product according to claim 1.

7. The gate for building of claim 6, in which the part is a gate pier.

8. A wall for a building at least a part of which is equipped with the functional coated product according to claim 1.

9. The functional coated product according to claim 1, wherein the substrate is a member for using the gate.

10. A window at least a part of which is equipped with the functional coated product according to claim 1.

11. The window according to claim 10, which is a lighting window.

12. The window according to claim 10, the part is a window frame.

13. An automobile at least a part of which is equipped with the functional coated product according to claim 1.

14. Mechanical equipment having at least a part of which is equipped with the functional coated product according to claim 1.

15. A member for highway-related construction at least a part of which is equipped the functional coated product according to claim 1.

16. The member for highway-related construction according to claim 15, which is a traffic-control sign, a side wall of the road, an electric-light pole or a protection fence.

17. A post for public notice at least a part of which is equipped with the functional coated product according to claim 1.

18. An illuminator at least a part of which is equipped with the functional coated product according to claim 1.

19. The functional coated product according to claim 1, wherein the substrate is a resin material to be used for an illuminator.

20. The functional coated product according to claim 1, wherein the substrate is a metal material to be used for an illuminator.

21. A functional coated product having a first coating layer formed of a cured coating of an acryl-modified silicone resin coating material comprising the following components (A), (B), (C) and (D) on a surface of a substrate, and a second coating layer formed of a cured coating of a functional coating material comprising the following components (A), (B), (C), (E) and (F), over the first coating layer;

Component (A):

a silica-dispersed organosilane oligomer solution obtained by partially hydrolyzing a hydrolyzable organosilane represented by the general formula $$R^1_mSiX_{4-m} \quad (I)$$

wherein $R^1$ indicates a monovalent hydrocarbon group having 1 to 8 carbon atoms, which may be the same or different, m indicates an integer of 0 to 3, and X indicates a hydrolyzable group in colloidal silica dispersed in an organic solvent, water or at mixed solvent of them, under the condition that 0.001 to 0.5 mol of water is used based on 1 mol equivalent of the above-mentioned hydrolyzable group (X);

Component (B):

a polyorganosiloxane represented by the average compositional formula $$R^2_aSi(OH)_bO_{(4-a-b)/2} \quad (II)$$

wherein $R^2$ indicates a monovalent hydrocarbon group having 1 to 8 carbon atoms, which may be the same or different, a and b separately satisfy the following condition:

$$0.2 \leqq a \leqq 2,\ 0.0001 \leqq b \leqq 3,\ a+b<4,$$

which contains a silanol group in the molecule structure and has an average molecular weight (in terms of polystyrene) of 700 to 20,000;

Component (C):

a curing catalyst;

Component (D):

an acrylic resin of copolymer of first (meth)acrylate represented by the general formula (III)

$$CH_2{=}CR^3(COOR^4) \quad (III)$$

in which $R^3$ is a hydrogen atom or a methyl group, and $R^4$ is a hydrocarbon group having 1 to 9 carbon atoms, the second (meth)acrylate of the general formula (III) in which $R^3$ is a hydrogen atom or a methyl group, and $R^4$ is at least one group selected from the group consisting of an epoxy group, a glycidyl group, and a hydrocarbon group containing at least either of the above, and the third (meth)acrylate of the general formula (III) in which $R^3$ is a hydrogen atom or a methyl group, and $R^4$ is a hydrocarbon group containing an alkoxy silyl group or a halogenated silyl group, and said acrylic resin having an average molecular weight (in terms of polystyrene) of 1,000 to 50,000;

Component (E):

an organosiloxane comprising a hydrolyzed polycondensate of;

5 to 30,000 parts by weight of a silica compound represented by the general formula:

$$Si(OR^5)_4$$

and/or colloidal silica, 100 parts by weight of a silica compound represented by the general formula:

$$R^6Si(OR^5)_3$$

and 0 to 60 parts by weight of a silica compound represented by the general formula:

$$R^6Si(OR^5)_2$$

wherein $R^5$ and $R^6$ indicate a monovalent hydrocarbon group and said weight-average molecular weight being adjusted to 800 or more in terms of polystyrene; and Component (F):

a photocatalyst.

22. A process for producing a functional coating material comprising the following steps:

forming a first coating layer by applying an acryl-modified silicone resin coating material containing the following components (A), (B), (C) and (D) to surface of a substrate, forming a semi-cured layer by semi-curing the first coating layer, forming a second coating layer by applying a functional coating material containing the following components (E) and (F) to surface of said semi-cured layer, and curing said semi-cured layer and said second coating layer;

Component (A):

a silica-dispersed organosilane oligomer solution obtained by partially hydrolyzing a hydrolyzable organosilane represented by the general formula $$R^1_mSiX_{4-m} \quad (I)$$

wherein $R^1$ indicates a monovalent hydrocarbon group having 1 to 8 carbon atoms, which may be the same or different, m indicates an integer of 0 to 3, and X indicates a hydrolyzable group in colloidal silica dispersed in an organic solvent, water or a mixed solvent of them, under the condition that 0.001 to 0.5 mol of water is used based on 1 mol equivalent of the above-mentioned hydrolyzable group (X);

Component (B):

a polyorganosiloxane represented by the average compositional formula $$R^2_aSi(OH)_bO_{(4-a-b)/2} \quad (II)$$

wherein $R^2$ indicates a monovalent hydrocarbon group having 1 to 8 carbon atoms, which may be the same or different, a and b separately satisfy the following condition:

$$0.2 \leqq a \leqq 2,\ 0.0001 \leqq b \leqq 3,\ a+b<4,$$

which contains a silanol group in the molecule structure and has an average molecular weight (in terms of polystyrene) of 700 to 20,000;

Component (C):

a curing catalyst;

Component (D):

an acrylic resin of copolymer of first (meth)acrylate represented by the general formula (III)

$$CH_2{=}CR^3(COOR^4) \quad (III)$$

in which $R^3$ is a hydrogen atom or a methyl group, and $R^4$ is a hydrocarbon group having 1 to 9 carbon atoms, the second (meth)acrylate of the general formula (III) in which $R^3$ is a hydrogen atom or a methyl group, and $R^4$ is at least one group selected from the group consisting of an epoxy group, a glycidyl group, and a hydrocarbon group containing at least either of the above, and the third (meth)acrylate of the general formula (III) in which $R^3$ is a hydrogen atom or a methyl group, and $R^4$ is a hydrocarbon group containing an alkoxy silyl group or a halogenated silyl group, and said acrylic resin having an average molecular weight (in terms of polystyrene) of 1,000 to 50,000;

Component (E):

an organosiloxane comprising a hydrolyzed polycondensate of;

5 to 30,000 parts by weight of a silica compound represented by the general formula $$Si(OR^5)_4$$

and/or colloidal silica, 100 parts by weight of a silica compound represented by the general formula:

$$R^6Si(OR^5)_3$$

and 0 to 60 parts by weight of a silica compound represented by the general formula:

$$R^6Si(OR^5)_2$$

wherein $R^5$ and $R^6$ indicate a monovalent hydrocarbon group and said weight-average molecular weight being adjusted to 800 or more in terms of polystyrene; and Component (F):

a photocatalyst.

23. The process for producing a functional coated product according to claim 22, wherein, in the above-mentioned acryl-modified silicone resin coating material, 1 to 94 parts by weight of Component (B) and 5 to 35 parts by weight of Component (D) are formulated in 1 to 94 parts by weight of Component (A), based on the solid content of the whole condensate (provided that the total amount of Components (A), (B) and (D) comes to 100 parts by weight).

24. The process for producing a functional coated product according to claim 22, which further contains a pigment.

25. The process for producing a functional coated product according to claim 22, wherein said substrate is selected from the group consisting of a metallic substrate, an organic substrate and an organic coating substrate in which either of the above substrates has a coating formed from an organic substance on the surface thereof.

26. A process for producing a functional coating material comprising the following steps:

forming a first coating layer by applying an acryl-modified silicone resin coating material containing the following components (A), (B), (C) and (D) to surface of a substrate, forming a semi-cured layer by semi-curing the first coating layer, forming a second coating layer by applying a functional coating material containing the following components (A), (B), (C) and (F) to surface of said semi-cured layer, and curing said semi-cured layer and said second coating layer;

Component (A):

a silica-dispersed organosilane oligomer solution obtained by partially hydrolyzing a hydrolyzable organosilane represented by the general formula $$R^1{}_mSiX_{4-m} \quad (I)$$

wherein $R^1$ indicates a monovalent hydrocarbon group having 1 to 8 carbon atoms, which may be the same or different, m indicates an integer of 0 to 3, and X indicates a hydrolyzable group in colloidal silica dispersed in an organic solvent, water or a mixed solvent of them, under the condition that 0.001 to 0.5 mol of water is used based on 1 mol equivalent of the above-mentioned hydrolyzable group (X);

Component (B):

a polyorganosiloxane represented by the average compositional formula $$R^2{}_aSi(OH)_bO_{(4-a-b)/2} \quad (II)$$

wherein $R^2$ indicates a monovalent hydrocarbon group having 1 to 8 carbon atoms, which may be the same or different, a and b separately satisfy the following condition:

$$0.2 \leqq a \leqq 2,\ 0.0001 \leqq b \leqq 3,\ a+b<4,$$

which contains a silanol group in the molecule structure and has an average molecular weight (in terms of polystyrene) of 700 to 20,000;

Component (C):

a curing catalyst;

Component (D):

an acrylic resin of copolymer of first (meth)acrylate represented by the general formula (III)

$$CH_2{=}CR^3(COOR^4) \quad (III)$$

in which $R^3$ is a hydrogen atom or a methyl group, and $R^4$ is a hydrocarbon group having 1 to 9 carbon atoms, the second (meth)acrylate of the general formula (III) in which $R^3$ is a hydrogen atom or a methyl group, and $R^4$ is at least one group selected from the group consisting of an epoxy group, a glycidyl group, and a hydrocarbon group containing at least either of the above, and the third (meth)acrylate of the general formula (III) in which $R^3$ is a hydrogen atom or a methyl group, and $R^4$ is a hydrocarbon group containing an alkoxy silyl group or a halogenated silyl group, and said acrylic resin having an average molecular weight (in terms of polystyrene) of 1,000 to 50,000;

Component (E):

an organosiloxane comprising a hydrolyzed polycondensate of;

5 to 30,000 parts by weight of a silica compound represented by the general formula:

$$Si(OR^5)_4$$

and/or colloidal silica, 100 parts by weight of a silica compound represented by the general formula:

$$R^6Si(OR^5)_3$$

and 0 to 60 parts by weight of a silica compound represented by the general formula:

$$R^6Si(OR^5)_2$$

wherein $R^5$ and $R^6$ indicate a monovalent hydrocarbon group and said weight-average molecular weight being adjusted to 800 or more in terms of polystyrene; and Component (F):

a photocatalyst.

* * * * *